United States Patent
Namerikawa et al.

(10) Patent No.: US 6,546,800 B1
(45) Date of Patent: Apr. 15, 2003

(54) ACCELERATION SENSOR ELEMENT, ACCELERATION SENSOR, AND METHOD OF MANUFACTURING THE SAME

(75) Inventors: Masahiko Namerikawa, Seto (JP); Kazuyoshi Shibata, Mizunami (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/674,698

(22) PCT Filed: Apr. 2, 1999

(86) PCT No.: PCT/JP99/01758

§ 371 (c)(1),
(2), (4) Date: Nov. 3, 2000

(87) PCT Pub. No.: WO00/60364

PCT Pub. Date: Oct. 12, 2000

(51) Int. Cl.$^7$ ............................................. G01P 15/09
(52) U.S. Cl. .............................. 73/514.34; 73/514.38
(58) Field of Search ..................... 73/514.34, 514.32, 73/514.35, 514.38; 310/329, 369

(56) References Cited

U.S. PATENT DOCUMENTS

| | | | |
|---|---|---|---|
| 4,924,131 A | * 5/1990 | Nakayama et al. | 310/329 |
| 5,267,269 A | 11/1993 | Shih et al. | 375/60 |
| 5,712,884 A | 1/1998 | Jeong | 327/158 |
| 5,994,934 A | 11/1999 | Yoshimura et al. | 327/158 |
| 6,008,680 A | 12/1999 | Kyles et al. | 327/277 |
| 6,043,695 A | 3/2000 | O'Sullivan | 327/157 |
| 6,098,461 A | * 8/2000 | Okada | 73/514.34 |

FOREIGN PATENT DOCUMENTS

| | | |
|---|---|---|
| EP | 0 869 367 A1 | 10/1998 |
| JP | 01-195368 | 8/1989 |
| JP | 01-285865 | 11/1989 |
| JP | 05-026744 | 2/1993 |
| JP | 05-029675 | 2/1993 |
| JP | 3015278 | 6/1995 |
| JP | 07-174782 | 7/1995 |
| JP | 7-174782 A | 7/1995 |
| JP | 8-43430 A | 2/1996 |
| JP | 08-051238 | 2/1996 |
| JP | 08-094661 | 4/1996 |
| JP | 09-184774 | 7/1997 |
| JP | 10-332503 A | 12/1998 |

OTHER PUBLICATIONS

U.S. patent application Ser. No. 09/674,748, Namerikawa et al., filed Nov. 3, 2000.

Johnson, Mark G, et al. "A Variable Delay Line PLL for CPU—Coprocessor Synchronization" Oct. 1988, pp. 1218–1223, *IEEE Journal of Solid–State Circuits,* vol. 23, No. 5.

Sonntag, Jeff, et al. "A Monolithic CMOS 10 MHz DPLL for Burst–Mode Data Retiming", Feb. 16, 1990, pp. 194–195 and 294, *1990 IEEE International Solid–State Circuits Conference Digest of Technical Papers,* 37$^{th}$ ISSCC, First Edition.

Everitt, James, et al., "A SMOS Transceiver for 10–Mb/s and 100–Mb/s Ethernet," *IEEE Journal of Solid–State Circuits,* vol. 33, No. 12, Dec. 1998, pp. 2169–2177.

* cited by examiner

*Primary Examiner*—Richard A. Moller
(74) *Attorney, Agent, or Firm*—Burr & Brown

(57) ABSTRACT

An acceleration sensor element including a weight, a support having a hollow part, which is disposed around the weight as a center, and a flexible plate having piezoelectric elements including a piezoelectric body sandwiched by at least one set of electrodes and disposed horizontally across the support to suspend the weight at the hollow part of the support. Acceleration applied from the exterior is converted into deflection of the flexible plate based on movement of the weight corresponding to the acceleration, and the direction and rate of the acceleration are three-dimensionally determined from the electric charges generated from the piezoelectric body corresponding to deflection of the flexible plate. The piezoelectric elements are disposed to be continuously constructed over the flexible parts of the flexible plate from the upper part of the weight and/or the support at the plane of projection seen from the upper part of the flexible plate.

10 Claims, 21 Drawing Sheets

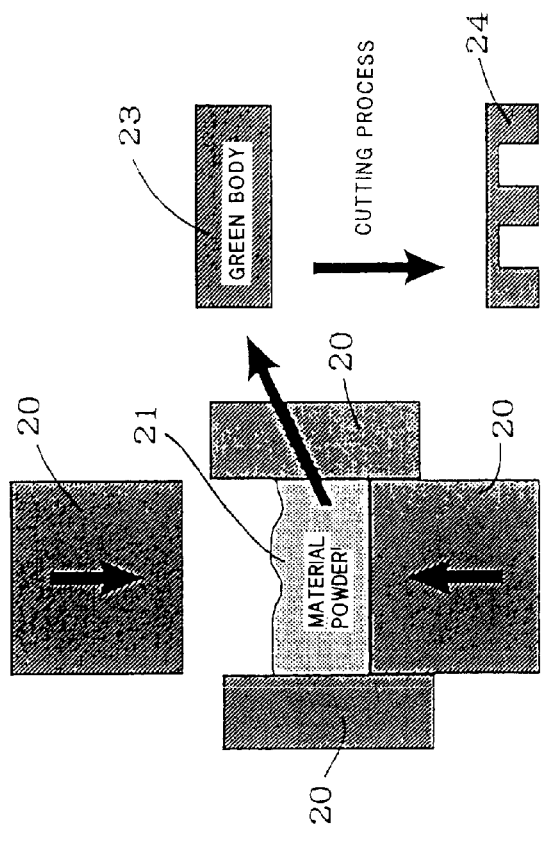
FIG. 5 - Prior Art
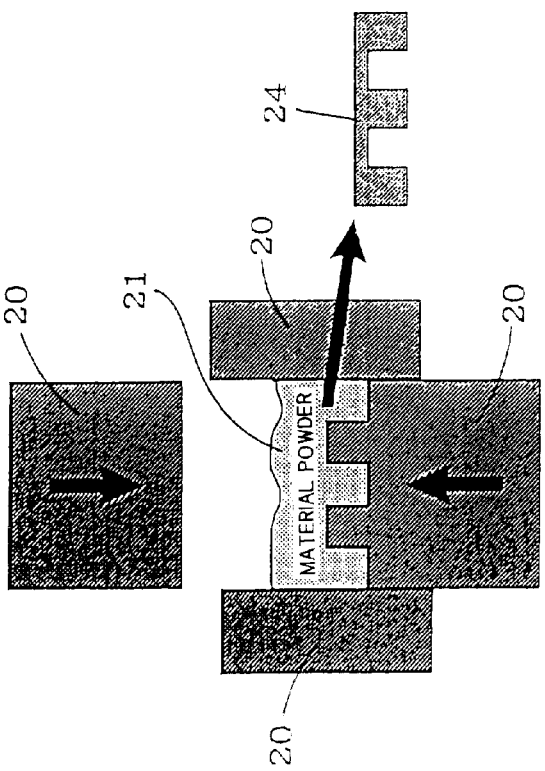
FIG. 6 Prior Art

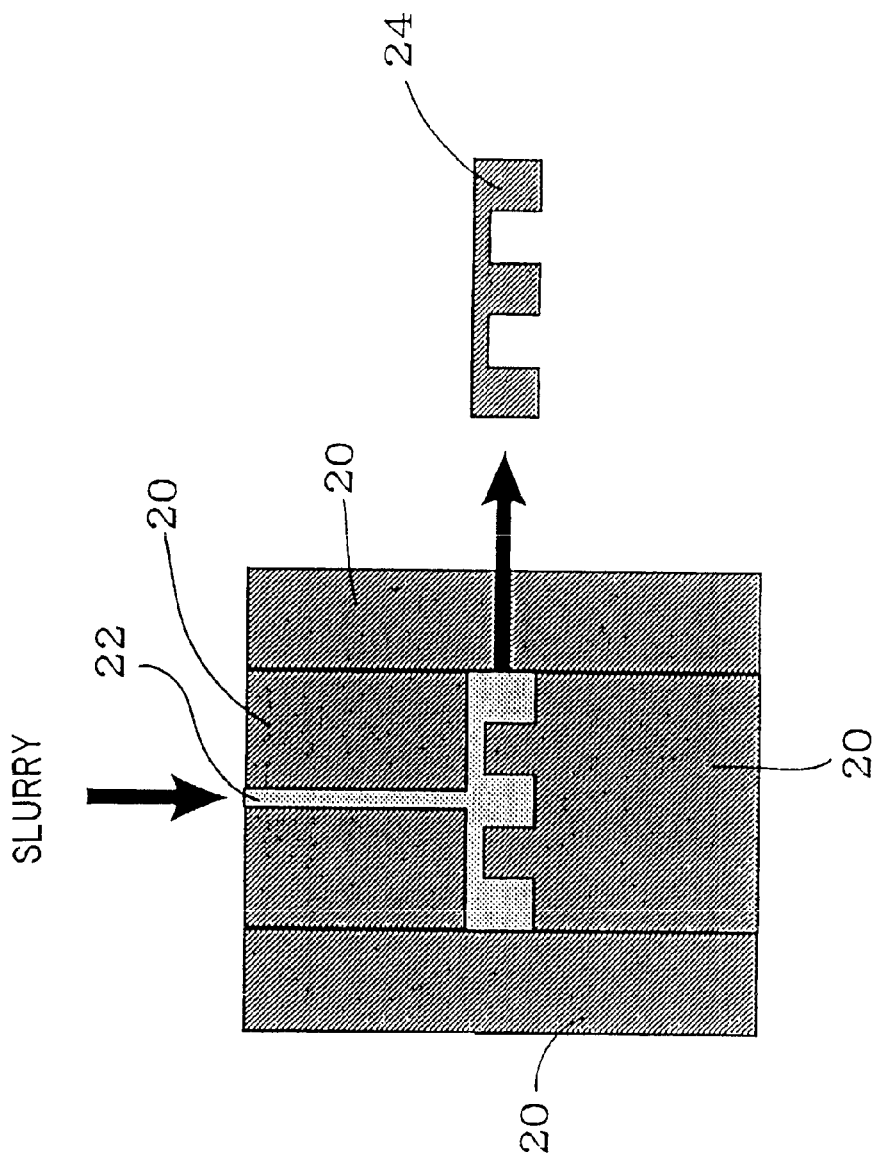
FIG. 7 - Prior Art

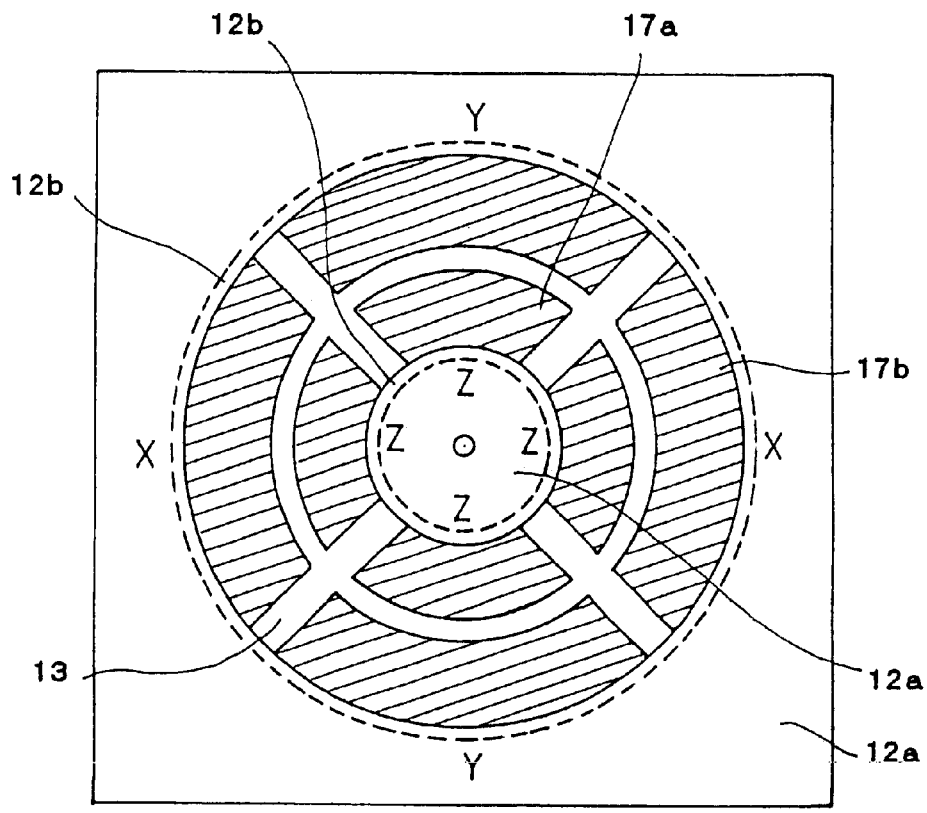
FIG.9(a) - Prior Art
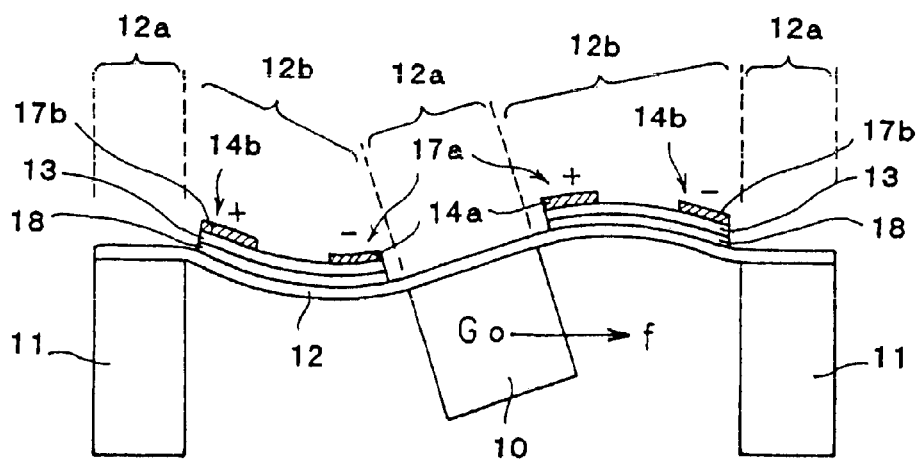
FIG.9(b) - Prior Art

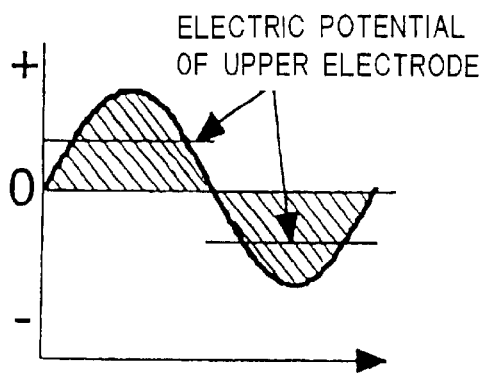 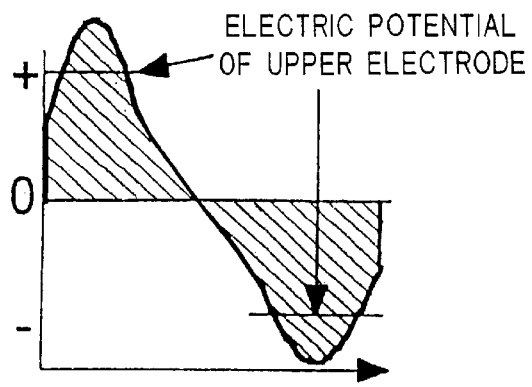
FIG.10(a)- Prior Art    FIG.10(b)

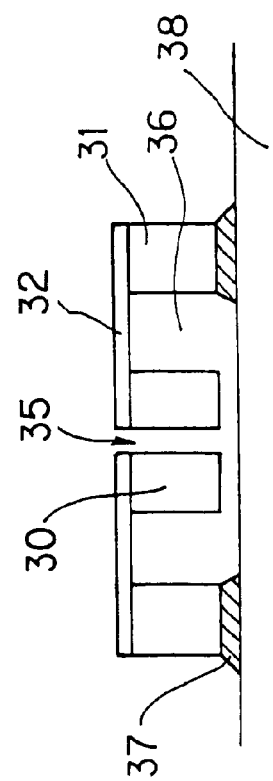
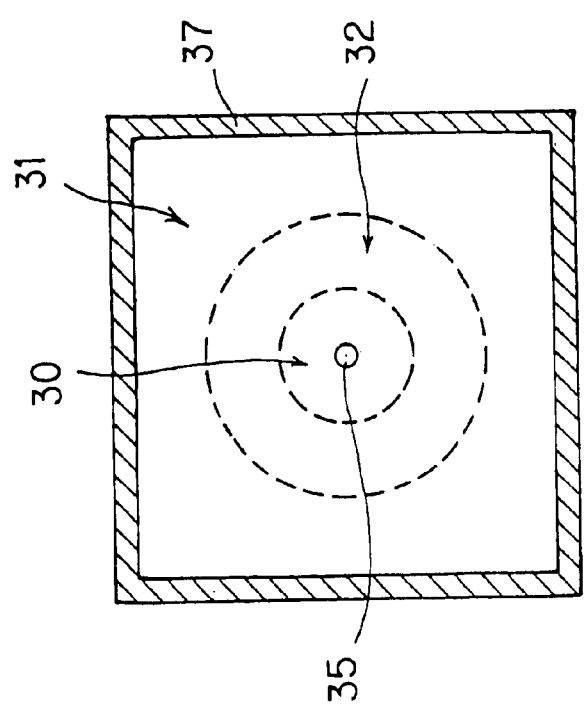
FIG.11(b)
FIG.11(a)

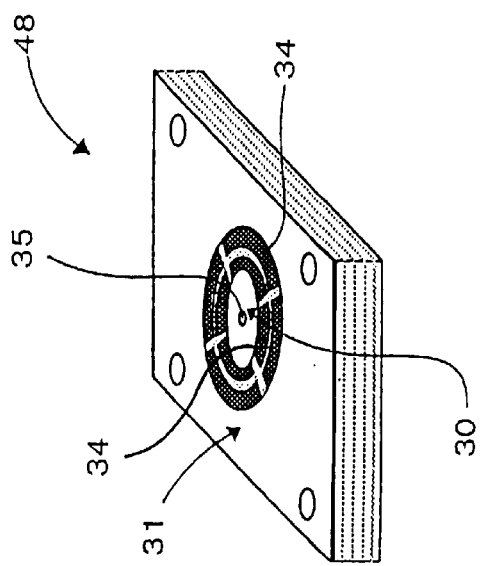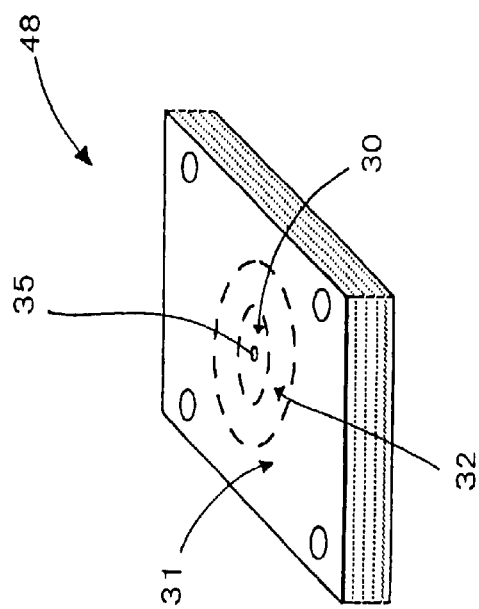
FIG. 18

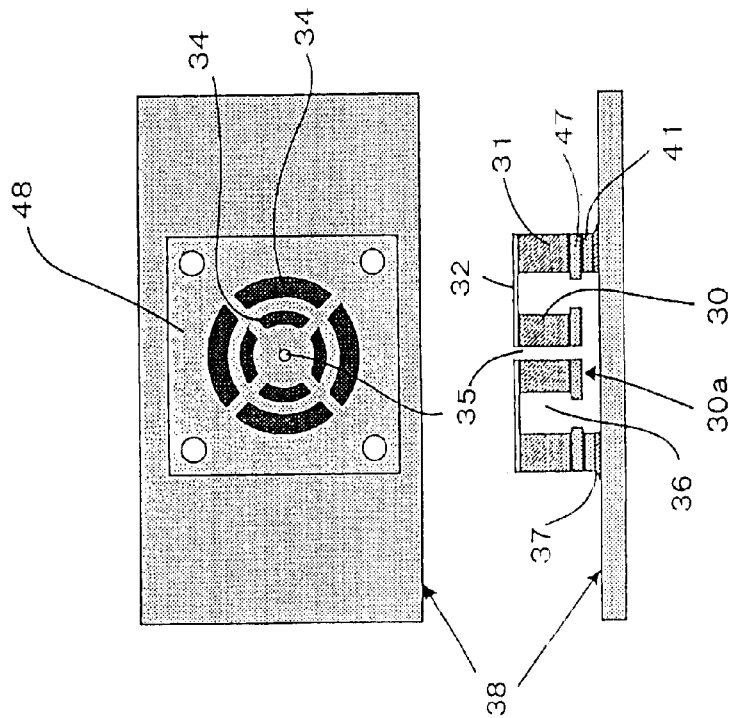
FOURTH LAYER EXISTS
FIG. 20(b)
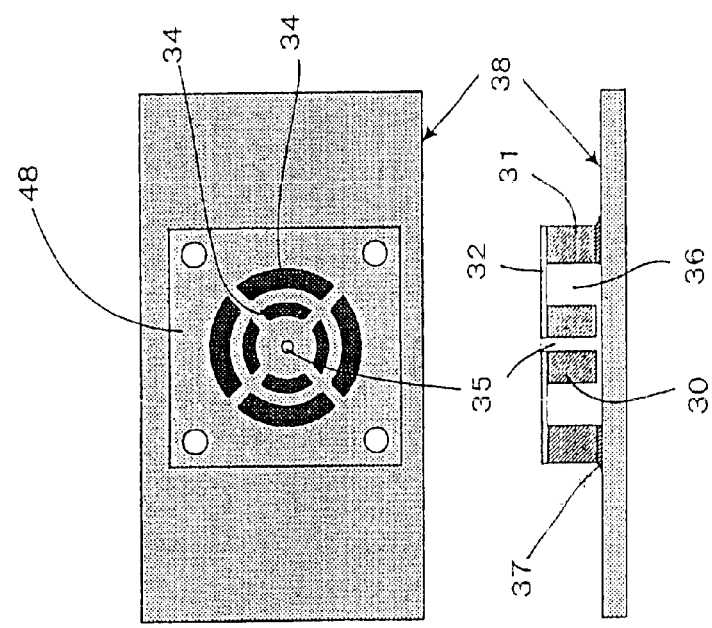
NO FOURTH LAYER
FIG. 20(a) - Prior Art

ACCELERATION SENSOR ELEMENT, ACCELERATION SENSOR, AND METHOD OF MANUFACTURING THE SAME

TECHNICAL FIELD

The present invention relates to an acceleration sensor element for three-dimensionally determining the direction and the rate of acceleration, applied from the exterior, using a piezoelectric body, to an acceleration sensor therewith, and to the manufacture thereof.

BACKGROUND OF THE INVENTION

In the automobile industry and the machinery industry, demands for sensors capable of accurately determining physical quantities such as force, acceleration, and magnetic force are-increasing. In particular, small sensors capable of detecting physical quantities for each component in two-dimensions or in three-dimensions are required.

For example, a sensor in which a plurality of piezoelectric bodies are mounted on a flexible plate having an operation body is disclosed in Japanese Unexamined Patent Application Publication No. 5-26744.

The sensor is constructed so that the flexible plate may be deflected corresponding to physical quantities applied to the operation body from the exterior, and can three-dimensionally determine the direction and the rate of the physical quantities by electric charges generated in the piezoelectric body, depending on the deflection of the flexible plate using a single sensor element.

The sensor element will be described, using as an example, an acceleration sensor having a weight as the operation body. As shown in FIG. 2, when acceleration a is applied to the sensor element from the exterior, an inertial force f is applied to a weight 10 in a direction opposite to the acceleration a, and as a result, deflection 14 due to the inertial force f is generated at a flexible plate 12 horizontally disposed between the weight 10 and a support 11. Since electric charges depending on the direction and the rate of the deflection 14 are generated at a piezoelectric body 13 constructed over the flexible plate 12, the acceleration applied from the exterior can be three-dimensionally determined by measuring the electric charges.

In the sensor element as shown in FIG. 3, the center of a base of the cylindrical weight 10, on which the flexible plate 12 is horizontally disposed, is specified as the origin O, a surface including the origin O, which is parallel to the flexible plate 12, is specified as an X-Y plane, the X-axis and Y-axis are specified so as to perpendicularly intersect each other in the X-Y plane, and the Z-axis is specified to include the origin O to perpendicularly intersect the X-Y plane.

In this instance, when it is assumed that a part sandwiched by one set of an upper electrode and a lower electrode of the piezoelectric body 13 is "one piezoelectric element," for example, four elements of piezoelectric bodies and electrodes, each corresponding to the X-axis and the Y-axis, and eight elements of piezoelectric bodies and electrodes corresponding to the Z-axis can be arranged on the flexible plate 12.

In this case, the magnitude of each inertial force f applied to the weight 1 by the acceleration a applied from the exterior is determined as follows: the magnitude of an inertial force $f_X$ in the X-axis direction as shown in FIG. 4(a) is determined by the amounts of the electric charges generated at "piezoelectric elements" $E_1$ to $E_4$; the magnitude of an inertial force $f_Y$ in the Y-axis direction is determined by the amounts at $E_5$ to $E_8$ (not shown); and the magnitude of an inertial force $f_Z$ in the Z-axis direction as shown in FIG. 4(b) is determined by the amounts at "piezoelectric elements" $E_9$ to $E_{12}$ and $E_{13}$ to $E_{16}$ (not shown).

In addition, the directions of the inertial forces are each determined from the polarity patterns of the electric charges (e.g., for a piezoelectric body top surface in FIG. 4(a), [+−+−] from the left; and for a piezoelectric body top surface in FIG. 4(b), [+−−+] from the left).

The inertial force f as a resultant force of $f_X$, $f_Y$, and $f_Z$ determined as described above, and the direction and the rate of the acceleration a applied from the exterior can be three-dimensionally determined by a single small sensor element.

In the aforesaid sensor element, if the flexible plate is deflected easily, the amount of the electric charge generated will be increased even if the same acceleration is applied to the weight, and accordingly, it is obvious that the flexibility of the flexible plate and the sensor sensitivity are correlated.

However, since the entire flexible plate does not deflect uniformly, the deflection stresses instead being uneven, even if the flexibility of the flexible plate is uniform, the amount of electric charges generated is decreased depending on the arrangement of the piezoelectric body, so that sensor sensitivity may be degraded.

In addition, in the aforesaid sensor element, the flexible plate is required to have high flexibility in order to have sufficient sensitivity, while the weight and support are required to have high rigidity and to be unlikely to deflect in order to accurately detect the acceleration applied thereto.

If the sensor element is constructed by assembling the members such as the weight, the support, and the flexible plate, which were manufactured separately, the aforesaid incompatible characteristics can be satisfied; however, there are problems in that many components and steps are required, resulting in lower productivity.

As a means for reducing the number of components and steps and improving productivity, integral formation using the same material is possible. When integral formation using ceramics is used as an example, the following methods may be mentioned: a method of cutting a green ceramic body 23 formed by filling a mold 20 with a ceramic power 21 and by conducting uniaxial pressing, etc., as shown in FIG. 5; a method of filling the ceramic powder 21 into the formed mold 20 for a sensor 34, and then performing uniaxial pressing as shown in FIG. 6; a method of injection molding ceramic slurry 22 as shown in FIG. 7; and a method of molding by slip casting.

In any of the aforesaid methods, however, since the strength of the flexible part of the integral compact is extremely low and the dispersion of the density distribution is large, it is difficult to make the flexible plate thin and to precisely control the thickness of the flexible plate. That is, in sensor elements formed by the above methods, the flexible plate is unlikely to deflect and the degree of deflection differs for each flexible plate or depending on portions thereof.

Accordingly, in addition to the drawback of low sensitivity, there is a case in which the sensitivity differs for each sensor element even if the same acceleration is applied, and also when the sensitivity differs for each axis, the direction and the rate of the acceleration obtained from the resultant force thereof are inaccurate, so that the sensor accuracy is reduced.

The present invention is made in consideration of the above problems, and objects thereof are to further improve sensor sensitivity and sensor accuracy while offering the advantages of a sensor element that is small and can measure three-dimensional physical quantities using a single sensor element, and to provide a manufacturing method in which the sensor element can be easily manufactured.

SUMMARY OF THE INVENTION

The present invention provides an acceleration sensor element (hereinafter referred to as "a sensor element") including a weight, a support having a hollow part, which is disposed around the weight as a center, and a flexible plate having piezoelectric elements in which a piezoelectric body is sandwiched by at least one set of electrodes. The flexible plate is disposed horizontally across the support so as to suspend the weight at the center of the hollow part of the support Acceleration applied from the exterior is converted to a deflection of the flexible plate based on the behavior of the weight arising corresponding to the acceleration, and the direction and the rate of the acceleration arc three-dimensionally determined from electric charges generated in the piezoelectric body corresponding to the deflection of the flexible plate. The piezoelectric elements are disposed in a manner so as to be continuously constructed over flexible parts of the flexible plate from the upper part of the weight and/or the support at the plane of projection seen from the upper part of the flexible plate.

The sensor element according to the present invention is preferably a sensor element having the support, the weight, and the flexible plate integrally sintered by a green-sheet lamination technique. In addition, it is preferably an acceleration sensor element having the support, the weight, and the flexible plate integrally formed, in which the crystal structure or the crystal-grain diameter of at least one of the support, the weight, and the flexible plate differs from that of the others.

Furthermore, the sensor element according to the present invention is preferably a sensor element having a hole penetrating perpendicularly in the center of the weight so that the space above the flexible plate and the support hollow part may communicate with each other, in which narrow grooves communicating with at least the space at the side of a support outer periphery are formed at the positions on a support lower-end surface, which are each symmetrical with respect to the straight lines passing through the support center on the plane including the support lower-end surface, and in which the weight is suspended so that the plane including the support lower-end surface does not contact the lower-end surface of the weight.

In addition, the present invention provides a manufacturing method for the acceleration sensor element, including a first step of laminating and compression bonding a green sheet having a configuration in cross section of a weight, a support, and a flexible plate to form a laminated layer, a second step of integrally sintering the laminated layer to form a sintered body, and a third step of forming the piezoelectric elements on the sintered body by a thick-film method and then sintering them.

In the manufacturing method according to the present invention, through holes are preferably punched in the center of the green sheet of the configuration in cross section of the weight and the flexible plate and at least two corners of the green sheet of the configuration in cross section of the support and the flexible plate, and laminating and compression-bonding are preferably conducted to form the laminated layer such that the through holes may be penetrated by support pins.

In addition, in the manufacturing method according to the present invention, it is preferable that after the green sheet of the configuration in cross section of the weight, the support, and the flexible plate has been laminated and compression bonded on a plate-like green sheet to form a laminated layer, and then the laminated layer has been integrally sintered to form a sintered body, the sintered flat green sheet is cut in order that the lower end of the weight can move.

Furthermore, in the manufacturing method according to the present invention, it is preferable that after the flat green sheet has been placed on a green sheet having a configuration in cross section of the support, and further the green sheet having a configuration in cross section of the weight, the support, and the flexible plate has been laminated and compression bonded to form a laminated layer, and then the laminated layer has been integrally sintered to form a sintered body, the sintered flat green sheet is cut in order that the lower end of the weight can move.

Furthermore, the present invention provides an acceleration sensor manufacturing method characterized in that the acceleration sensor element according to the present invention is fixed on a circuit board and is sealed by a cover in a dry atmosphere having a dew point of −40° C. or less.

BRIEF DESCRIPTION OF THE DRAWINGS

FIG. 5 is a schematic explanatory view showing an example of conventional integral ceramic molding.

FIG. 6 is a schematic explanatory view showing an example of conventional integral ceramic molding.

FIG. 7 is a schematic explanatory view showing an example of conventional integral ceramic molding.

FIG. 9(a) is a top view showing an embodiment of a conventional sensor element and FIG. 9(b) is a front sectional view showing an operation state thereof.

FIGS. 10(a) and 10(b) are schematic views showing the respective effect of the conventional sensor element (10(a)) and the sensor element according to the present invention (10(b)).

FIG. 11(a) is a top view showing an embodiment of the sensor element according to the present invention and FIG. 11(b) is a front sectional view thereof.

FIG. 18 is a process view showing a piezoelectric-element forming method.

FIG. 20(a) is a top view and a front sectional view showing an embodiment of the conventional sensor element and FIG. 20(b) is a top view and a front sectional view showing an embodiment of the sensor element according to the present invention.

DETAILED DESCRIPTION OF THE INVENTION

The present invention will be described in detail hereinbelow with reference to the drawings.

Figure 3A:
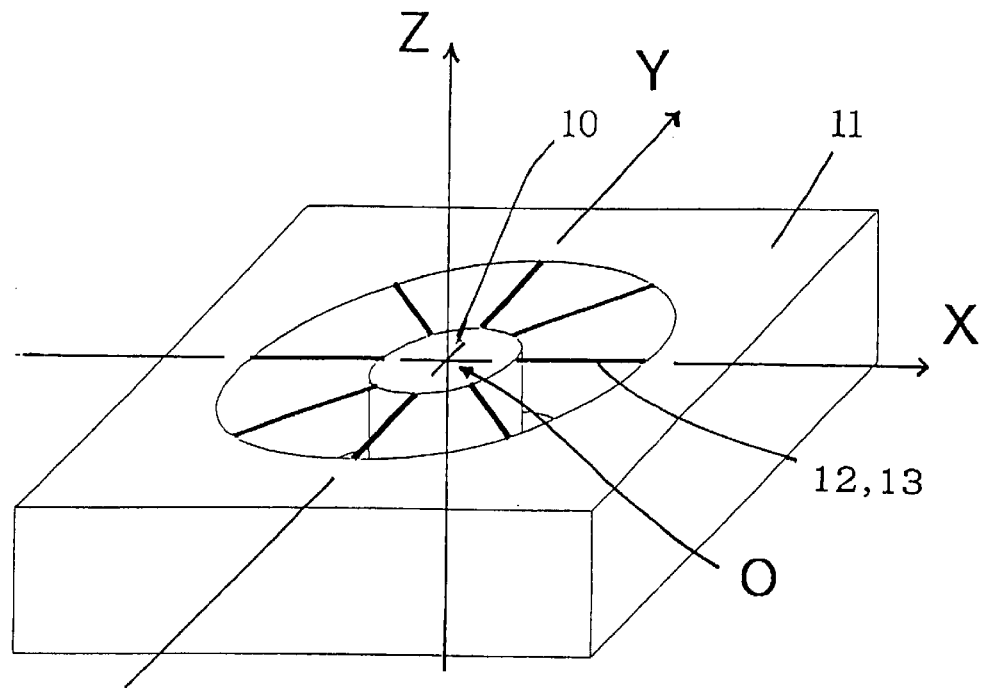
FIG. 3(a) is a schematic perspective view showing an embodiment of the sensor element used in the present invention.
Figure 3B:
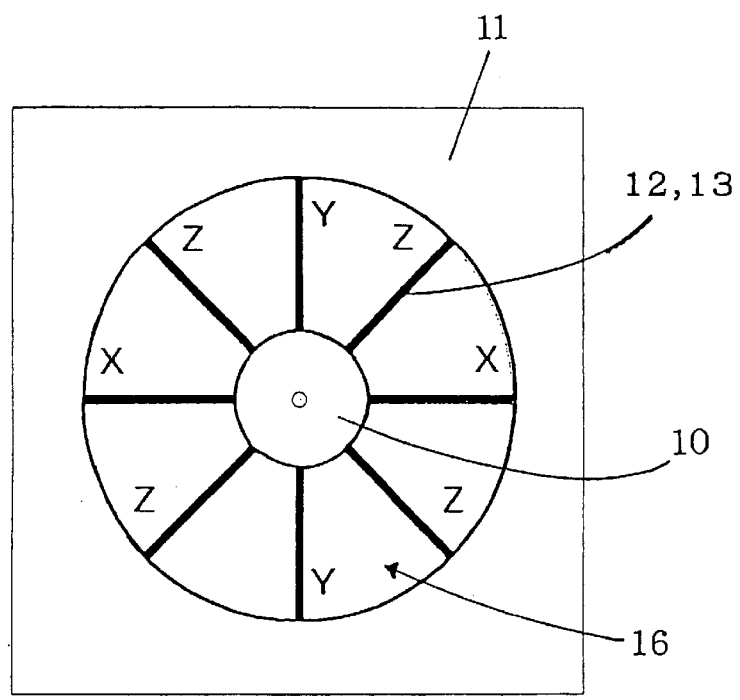
FIG. 3(b) is a top view thereof.
Figure 4A:
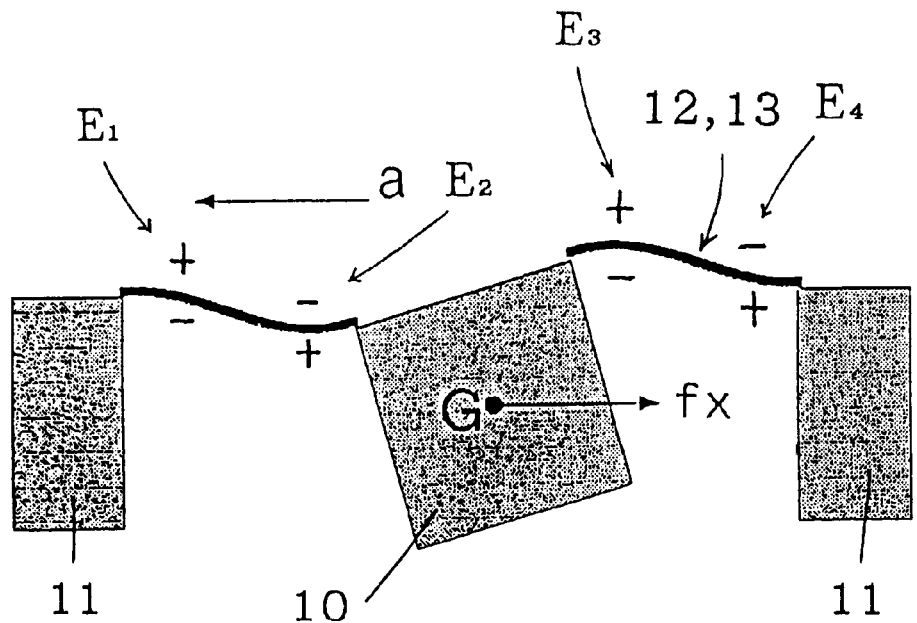
FIGS. 4(a) and 4(b) are schematic explanatory views showing an operation state of the sensor element used in the present invention.
Figure 4B:
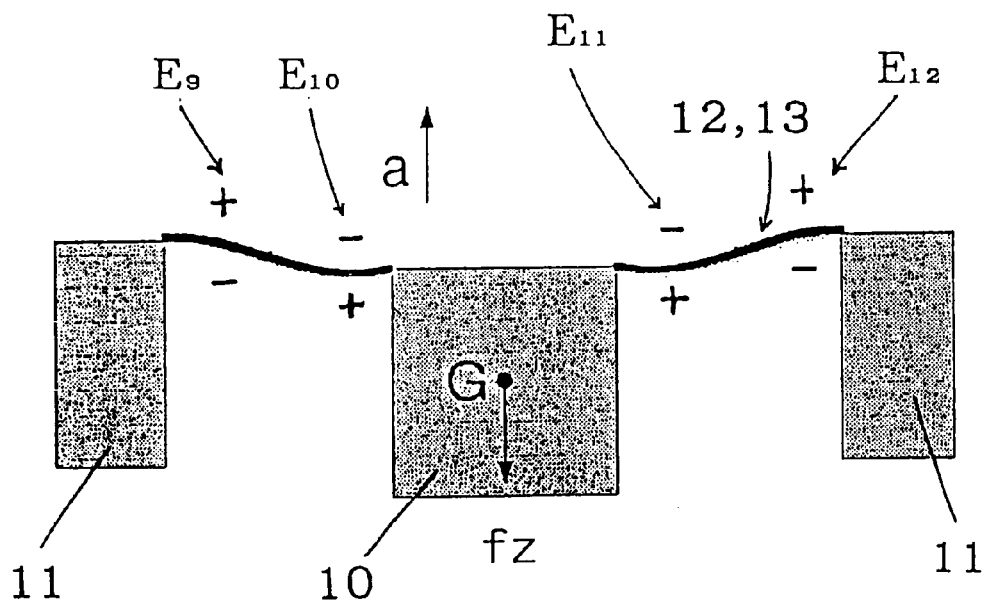

A sensor element used in the present invention includes, as shown in FIGS. 3(a) and 3(b) for example, a weight 10, a support 11 disposed around the weight 10 as a center, and a flexible plate 12 having piezoelectric elements in which a piezoelectric body 13 is sandwiched by at least one set of electrodes, which is disposed horizontally between the facing supports 11 while suspending the weight 10.

In the sensor element, the flexible plate 12 is deflected by the force exerted on the weight 10 based on the rate and the direction of the acceleration applied from the exterior, and the rate and the direction of the acceleration are determined in three-dimensions by the amount and the electrode patterns of electric charges of the piezoelectric elements generated corresponding to the deflection.

According to the present invention, the support 11 is a member for supporting the flexible plate 12 and the weight 10 disposed around the weight 10 as a center.

Accordingly, although the shape, material, etc., of the support are not limited so long as it has a strength capable of supporting the flexible plate 12 and the weight 10, the support preferably has an external shape of a rectangular prism and has a cylindrical hollow part 16 as shown in FIGS. 3(a) and 3(b), and is preferably constructed of a ceramic that has high rigidity and which is unlikely to be influenced by electromagnetic waves so that processing is facilitated and the symmetry with respect to acceleration in the X-Y plane is relatively high.

According to the present invention, the weight 10 is a member suspended in a manner such that the upper end surface thereof comes into contact with the flexible plate 12 to produce deflection at the flexible plate 12 by the force generated based on the rate and the direction of the acceleration applied from the exterior, and which may be adhered to the flexible plate 12 using an adhesive agent, etc., or which may be integrally formed with the flexible plate 12.

The shape of the weight is not particularly limited so long as the weight can be suspended so that the upper end surface thereof may come into contact with the flexible plate, and a cylindrical shape or a shape in which the exterior diameter continuously or discontinuously changes such as a frustum of a cone and a different-diameter cylinder is possible. However, a cylindrical shape as shown in FIGS. 3(a) and 3(b) is preferable from the viewpoint of a high degree of symmetry with respect to the acceleration in the X-Y plane.

Although the material is also not particularly limited, the weight is preferably constructed of a ceramic, which is a material having a sufficient mass and a high density, which is unlikely to be influenced by electromagnetic waves, and which has a low thermal expansion coefficient.

According to the present invention, the flexible plate 12 is a flat member having the piezoelectric elements, which is disposed horizontally between the facing supports 11 while suspending the weight 10, and the entire flexible plate may be constructed of a piezoelectric body.

Figure 8A:
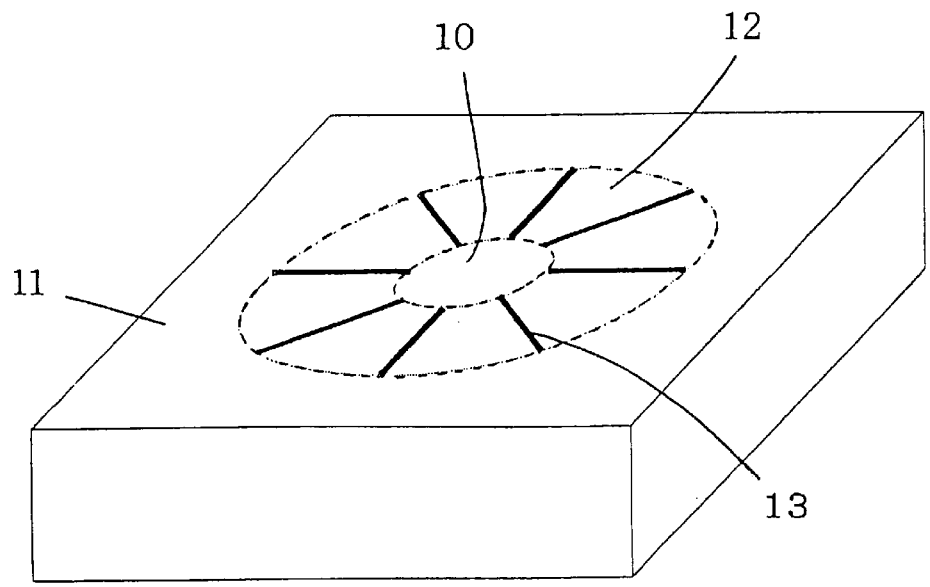
FIG. 8(a) is a schematic perspective view showing an embodiment of the sensor element used in the present invention and FIG. 8(b) is a top view thereof.
Figure 8B:
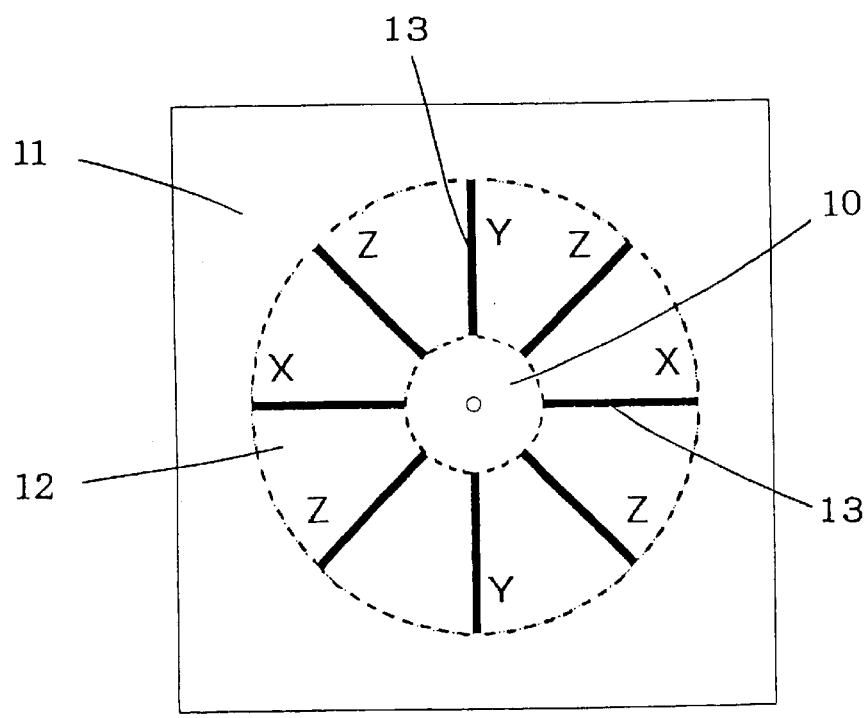

Although the shape and material, etc., of the flexible plate is not particularly limited so long as it has flexibility and is not damaged by the movement of the weight, the material is preferably a ceramic, and has a high modulus of direct elasticity and is likely to induce distortion in the piezoelectric body, and as for the shape, it is preferable that it be constructed as a single flat body as shown in FIGS. 8(a) and 8(b) because it can be easily processed.

The flexible plate has the piezoelectric elements in which the piezoelectric body 13 is sandwiched by at least one set of electrodes. Although piezoelectric ceramics such as PZT, PMN, and PNN, or an organic piezoelectric body can be used as the piezoelectric body, it is preferable to use PZT having superior piezoelectric characteristics.

As for the piezoelectric body, although the flexible plate itself may be constructed of the piezoelectric body, the piezoelectric body 13 may be disposed over the entire flexible plate 12 as shown in FIGS. 9(a) and 9(b), and also the piezoelectric body 13 may be radially disposed on the disk-shaped flexible plate 12 while setting the center of the weight 10 as the origin O as shown in FIGS. 8(a) and 8(b).

According to the present invention, the part in which the piezoelectric body is sandwiched by a set of electrodes (an upper electrode and a lower electrode) from the upper and lower surfaces is called a "piezoelectric element". Accordingly, the number of the elements can be increased depending not only on the number of the piezoelectric bodies, but also by the way in which the electrodes are arranged.

The deflection of the flexible plate generated based on the direction and the rate of acceleration applied from the exterior can be electrically determined by the piezoelectric elements.

The sensor element according to the present invention is characterized in that the aforesaid sensor element has the piezoelectric elements disposed in a manner so as to be continuously constructed over the flexible parts of the flexible plate from the upper part of the weight and/or the support at a projection plane seen from the upper part of the flexible plate.

Since the piezoelectric elements are disposed at parts of the flexible plate in which deflection stress is most concentrated, the voltage generated at the piezoelectric elements is increased even under the same conditions, thereby yielding a highly sensitive sensor.

In other words, a highly sensitive sensor can be provided which not only does not require a larger weight but also does not require that the sensor be increased in size. Accordingly, the invention can be particularly preferably used when using an amplifier having large input impedance such as a field-effect transistor (FET) as an amplifier for an output from the piezoelectric elements.

Figure 1A:
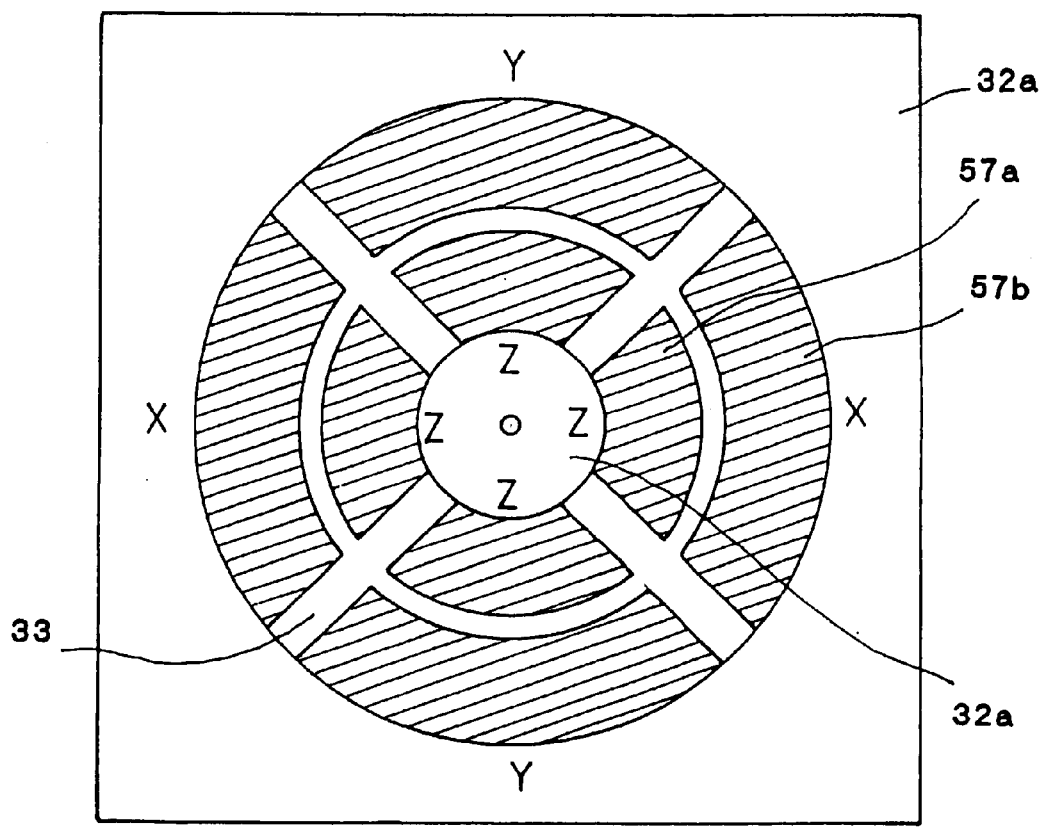
FIG. 1(a) is a top view showing an embodiment of a sensor element according to the present invention.
Figure 1B:
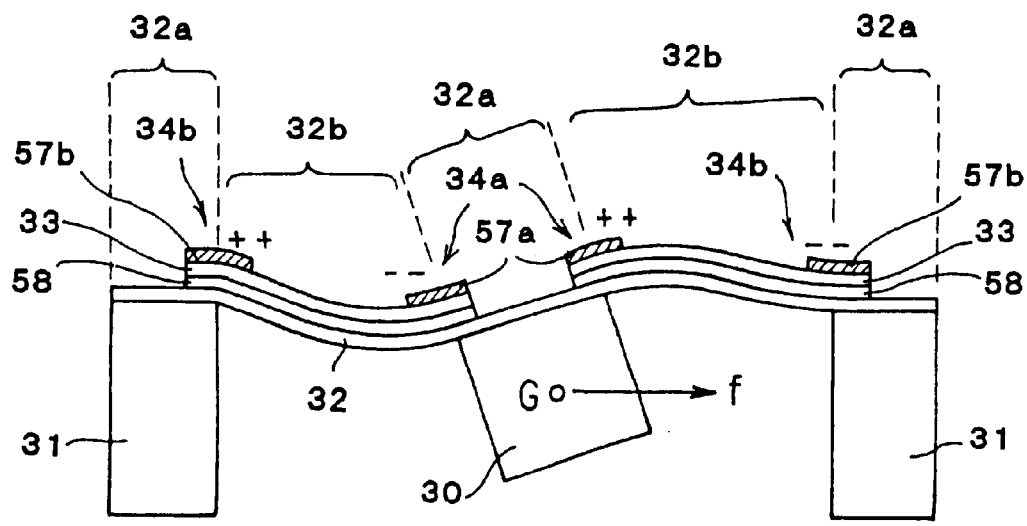
FIG. 1(b) is a front sectional view showing an operation state thereof.
Figure 2:
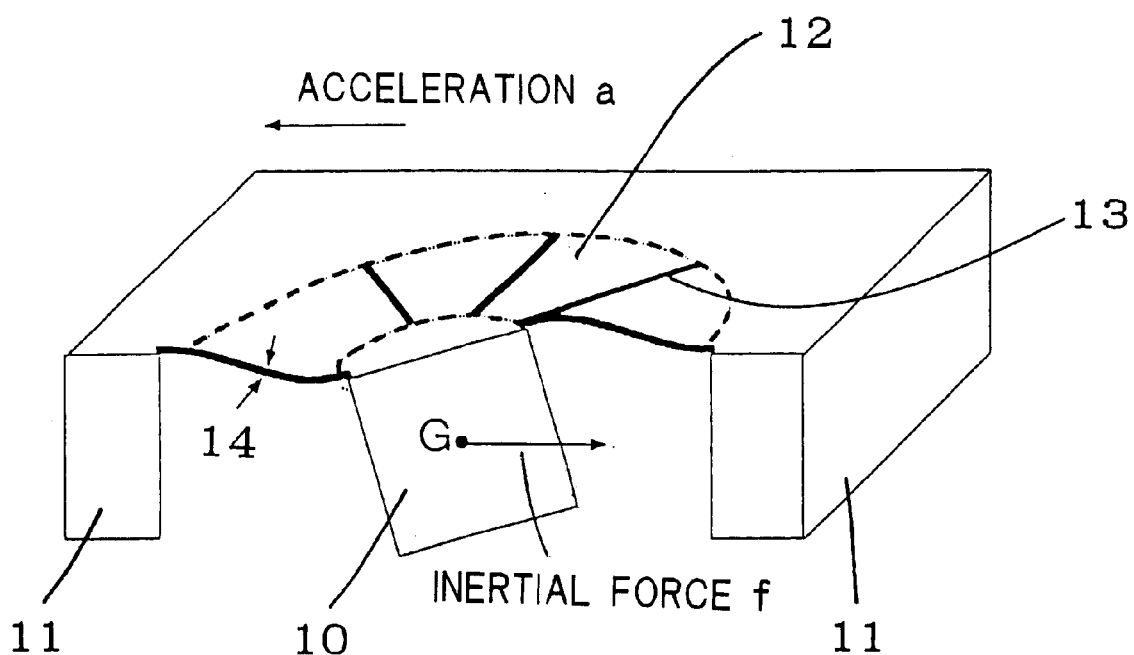
FIG. 2 is a schematic perspective view showing an embodiment of the sensor element used in the present invention.

In FIGS. 1(a) and 1(b), there is shown an example in which the above construction is applied to the sensor element.

In the sensor element in FIGS. 1(a) and 1(b) (hereinafter referred to as "sensor element A"), a disk-shaped flexible plate 32 is disposed horizontally between a weight 30 and a support 31, and piezoelectric elements 34a and 34b are continuously constructed over flexible parts 32b of the flexible plate 32 from the upper part of the weight 30 or the support 31 at a projection plane seen from the upper part of the flexible plate 32.

That is, assuming that parts of the flexible plate 32, which are fixed to the upper end surface of the weight 30 and the support 31 are nonflexible parts 32a, and parts other than these are the flexible parts 32b, the piezoelectric elements 34a and 34b are disposed in a manner so as to cross over the boundary between the flexible parts 32b and the nonflexible parts 32a.

When an acceleration a is applied to the sensor element A from the exterior, an inertial force f is applied to the weight 30 in the direction opposite to the acceleration a, resulting in the generation of a deflection due to the inertial force f at the flexible plate 32 disposed between the weight 30 and the support 31.

Since the piezoelectric elements 34a and 34b of the sensor element A are disposed in a manner so as to cross over the boundary of the flexible parts 32b and the nonflexible parts 32a, at which a deflection stress (distortion) is concentrated, a large distortion is generated in the piezoelectric elements.

On the other hand, as shown in FIGS. 9(a) and 9(b), since a sensor in which piezoelectric elements 14 are provided only at flexible parts 12b (hereinafter referred to as "sensor element B") does not have the piezoelectric element at the aforesaid stress-concentrated parts, the large distortion is not generated in the piezoelectric elements.

In this instance, either of the deflection patterns of the flexible plates of the sensor element A and the sensor element B are [convex-concave-convex-concave] from the left. Accordingly, the polarity pattern of electric charges generated on the upper surface of the piezoelectric elements becomes [+−+−], and the direction of the acceleration a, determined by the polarity pattern of the electric charges, does not differ between the sensor element A and the sensor element B.

On the other hand, since the voltage generated between the electrodes due to the generation of the electric charges is determined depending on the degree of the deflection at locations at which piezoelectric elements are disposed on the flexible plate, in the case where the applied acceleration is the same, even if the amount of deflection of the entire flexible plate is the same, the amount of deflection at the locations at which piezoelectric elements are disposed on the sensor element A is larger than that of the sensor element B. Accordingly, as shown in FIGS. 10(a) and 10(b), the voltage (potential) generated between the electrodes of the sensor element A is also larger than that of the sensor element B.

That is, the sensor element A can determine the direction of the acceleration a in a manner similar to the sensor element B, and even if the flexibility of the flexible plate is the same, the sensor sensitivity is greater than that of the sensor element B.

The sensor element having the above construction is preferably one in which the support, the weight, and the flexible plate are integrally sintered by a green-sheet lamination technique.

The green sheet is made by drying a mixed slurry of ceramic fine powder, solvent, etc., into a thin plate, having characteristics such that it has substantial flexibility and processability and can be cut, punched and adhered. Accordingly, by laminating a plurality of green sheets together and compression bonding the sheets together, and then sintering the sheets, a desired shape can be formed (hereinafter the method is referred to as the "green-sheet lamination technique").

The green-sheet lamination technique can be applied to the sensor element according to the present invention to integrally sinter the support, the weight, and the flexible plate, and the sensor element formed as mentioned above has remarkable effects that will be described as follows.

First, since the green sheet itself is easily formed into a thin plate and has great uniformity of thickness among sheets and within sheets, it is easy to make the flexible plate thin and to accurately control the thickness thereof. That is, the sensor element formed by the aforesaid method has a high sensitivity because the flexible plate thereof is greatly deflected even at low accelerations, and it also has a high level of uniformity among sensor elements and high accuracy in the direction and the rate of acceleration obtained by the resultant force of each axis because the variation in the deflection of each flexible plate or portion of a flexible plate is small.

Second, since the thickness can be adjusted by choosing the number of thin plates to be laminated together, the thickness of the weight can be easily finely adjusted by the number of thin plates to be laminated together. This, in turn, particularly affects the sensitivity in the X- and Y-axis directions, thereby balancing with the sensitivity in the Z-axis direction. That is, the sensor element formed by the aforesaid method has a good balance of sensitivity between the X- and Y-axis directions and the Z-axis direction, and as a result, electrical calibration of the circuit can be reduced.

Third, since a sheet of a different material or thickness can be selected for each position and material on which the thin plates cut to the configuration in cross section are laminated with respect to each of the support, the weight, and the flexible plate, the sheets can be distinguished in a manner such that a highly flexible thin sheet is used for the flexible plate and a highly rigid thick sheet is used for the other material.

In other words, since the sensor element formed by the aforesaid method is integrally formed while the flexible portions are easily deflected and the support and the weight have high rigidity, the sensor element is highly sensitive and highly accurate.

In addition to the above effects, according to the green-sheet lamination technique, since a number of sensors can be manufactured from one sheet by molding and cutting with high productivity, sensors can be provided extremely economically. These effects cannot be obtained by other integral-forming methods.

By using a technique of a thick-film method, such as screen-printing, for the sensor formed by the green-sheet lamination technique to form the lower electrode, the piezoelectric body, and the upper electrode, a small, highly sensitive, and highly accurate sensor element can be easily manufactured.

In addition, the sensor element according to the present invention is preferably the acceleration sensor element in which the support, the weight, and the flexible plate are integrally formed, and the crystal structure or crystal-grain diameter of at least one of the support, the weight, and the flexible plate preferably differs from that of the others. It is because the characteristics of each member can be controlled while taking advantage of integral forming that the numbers of the parts and processes are reduced so as to improve the productivity. For example, by having the easy-bending flexible crystal structure or crystal-grain diameter for the flexible plate and by having the highly rigid crystal structure or crystal-grain diameter for the weight and the support, a highly sensitive and highly accurate sensor can be provided.

The method for controlling the characteristics of the flexible plate, etc., by using the crystal structure or the crystal-grain diameter is useful for integral forming using metal, as well as for ceramics. In the case of synthetic resin, the characteristics of the flexible plate, etc., may be controlled by the degree of polymerization.

In the sensor element according to the present invention, as shown in FIGS. 11(a) and 11(b), a through hole 35 penetrated perpendicularly in the center of the weight 30 is preferably provided so that the space above the flexible plate 32 and a support hollow part 36 may be communicated with each other.

In the case where the piezoelectric elements are formed on the integral sintered body of the support 31, the weight 30, and the flexible plate 32 by the thick-film method and are then sintered, the flexible plate 32 changes corresponding to the sintering shrinkage of the piezoelectric bodies, so that a residual stress is generated at the flexible plate 32. Since the residual stress increases the spring constant of the flexible plate 32, the flexible plate 32 is hardened so as to be difficult to deflect, resulting in degradation of the sensor sensitivity.

By providing the through hole 35 in the weight 30, the residual stress at the flexible parts is released to the weight, resulting in a state where stress is exerted on the weight, thereby increasing the rigidity of the weight.

In addition, conventionally, as shown in FIG. 18, although when the piezoelectric elements 34 are formed on the integral sintered body 48, the relative position with respect to the flexible plate 32 and the weight 30 cannot be precisely controlled, and the precision in the size is not always high, a highly accurate sensor having a very precise size can easily be formed by forming the electrodes, the piezoelectric body, etc., with reference to the through hole 35.

Figure 12B:
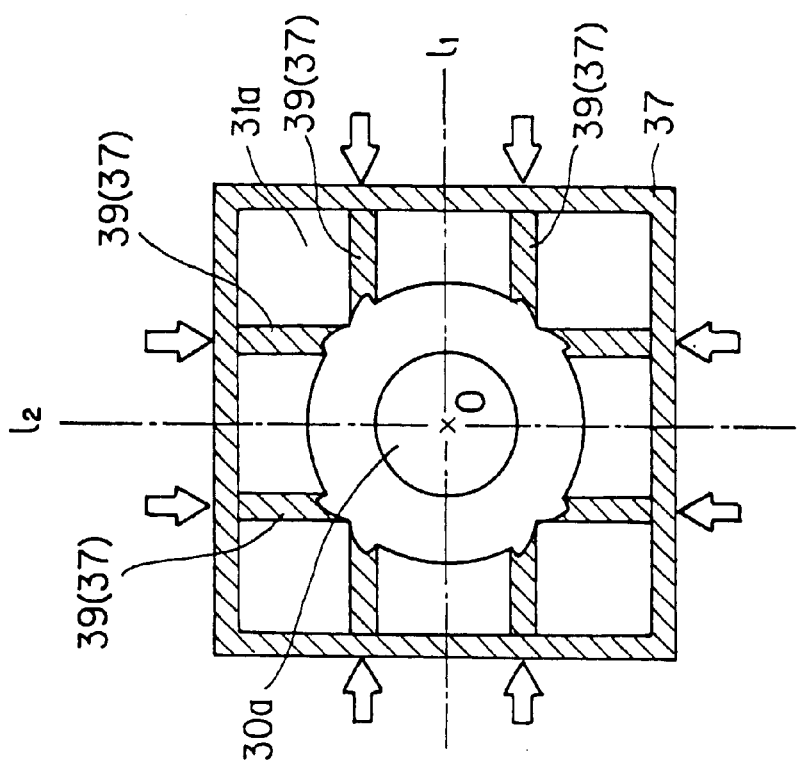
FIG. 12(a) is a top view showing an embodiment of the sensor element according to the present invention and FIG. 12(b) is a front sectional view thereof.
Figure 12A:
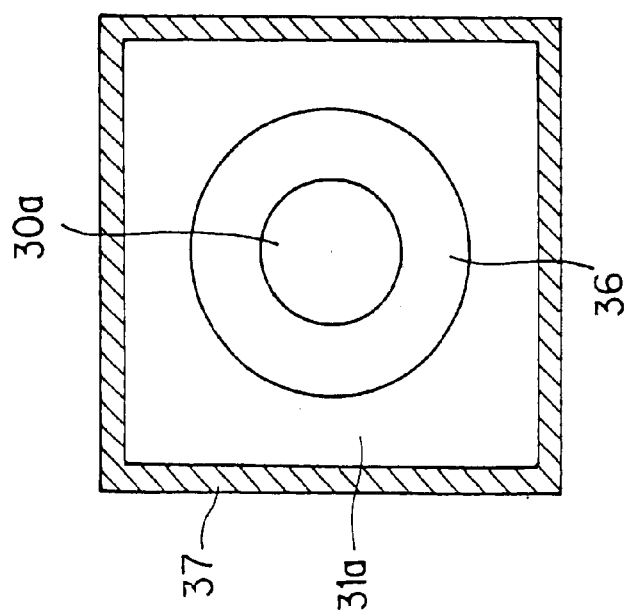

In the sensor element according to the present invention, as shown in FIGS. 12(a) and 12(b) for example, narrow grooves 39 communicating with at least the space at the side of an outer periphery of the support 31 are preferably formed at the positions on a support end surface 31a, which are symmetric with respect to straight lines $1_1$ and $1_2$ passing through the support center O on the plane including the support lower-end surface 31a. This is because the residual stress of the flexible plate 32 can be reduced in a manner similar to that with the through hole 35 by forming the narrow grooves 39 on the support lower-end surface 31a after forming the piezoelectric elements, thereby minimizing the degradation of the sensor sensitivity.

In addition, the narrow grooves 39 have an anchoring effect of improving the adhesion strength when the sensor element is adhered and fixed to a circuit board or a package.

That is, when the sensor element is adhered and fixed to the circuit board, etc., the sensor element is preferably positioned in a state where no adhesive agent 37 exists on the support lower-end surface 31a and a surface 38 of the circuit board, etc., which is then adhered in order to facilitate the fine adjustment of the adhering position.

By providing the narrow grooves 39 communicating with the space at the side of the outer periphery of the support 31, even if the adhesive agent 37 is adhered from the part around the sensor element after positioning the sensor element, tight adhesion can be possible because the adhesive agent 37 enters the support lower-end surface 31a through the narrow grooves 39. Such effects are particularly effective for applications for which high adhesive properties are required for withstanding strong impacts, such as for activating an automobile air bag, etc.

Figure 13B:
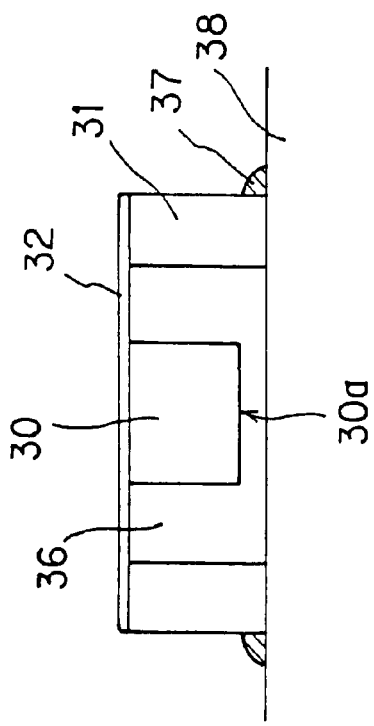
FIG. 13(a) is a top view showing an embodiment of the sensor element according to the present invention and FIG. 13(b) is a front sectional view thereof.
Figure 13A:
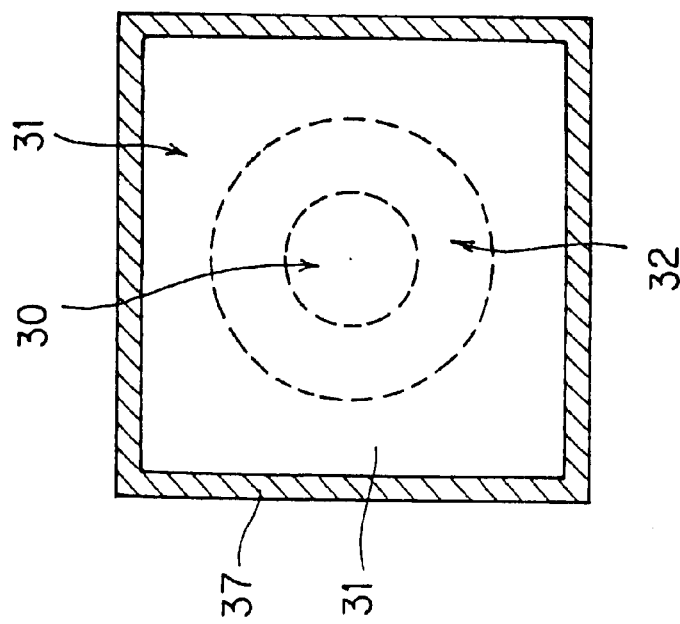

Furthermore, in the sensor element according to the present invention, as shown in FIGS. 13(a) and 13(b), the weight 30 is preferably suspended so that the plane 38 including the support lower-end surface does not contact a lower end surface 30a of the weight.

Conventionally, as shown in FIGS. 11(a) and 11(b), the sensor element is mounted in such a manner that the support 31 is loose depending on the adhesion state of the adhesive agent 37 in order to prevent the lower-end surface 30a of the weight and the circuit board 38, etc., from contacting each other due to the vibration of the weight 30. According to the construction of the present invention, the lower-end surface 30a of the weight can be held in a state so as not to contact the circuit board 38, etc., by the construction of the sensor element itself.

The sensor element according to the present invention can be preferably manufactured by a manufacturing method including: a first step of laminating and compression-bonding the green sheet of the configuration in cross section of the weight, the support, and the flexible plate to form a laminated layer; a second step of integrally sintering the laminated layer to form a sintered body; and a third step of forming piezoelectric elements on the sintered body by the thick-film method, and then sintering the piezoelectric elements to the sintered body.

By using the green-sheet lamination technique, the flexible plate may be made thin and homogeneous, the thickness of the weight is finely adjusted, materials for each member are optimized, and the production efficiency is improved, and also the materials for each sheet can be changed, so that materials having different crystal structure or materials having different crystal-grain diameter can be integrally formed.

Furthermore, in the manufacturing method according to the present invention, the through holes are preferably punched in the center of the green sheet of the configuration in cross section of the weight and the flexible plate and at least two corners of the green sheet of the configuration in cross section of the support and the flexible plate, and laminating and compression-bonding are preferably conducted in a state where the through holes are penetrated by the support pins to form the laminated layer.

By the construction as described above, the sensor element having the through hole at the center of the weight can be remarkably easily manufactured. In addition, using the support pins increases the relative positioning accuracy of the weight, the support, and the flexible plate, and as a result, a sensor element of highly precise size can be manufactured.

Figure 14:
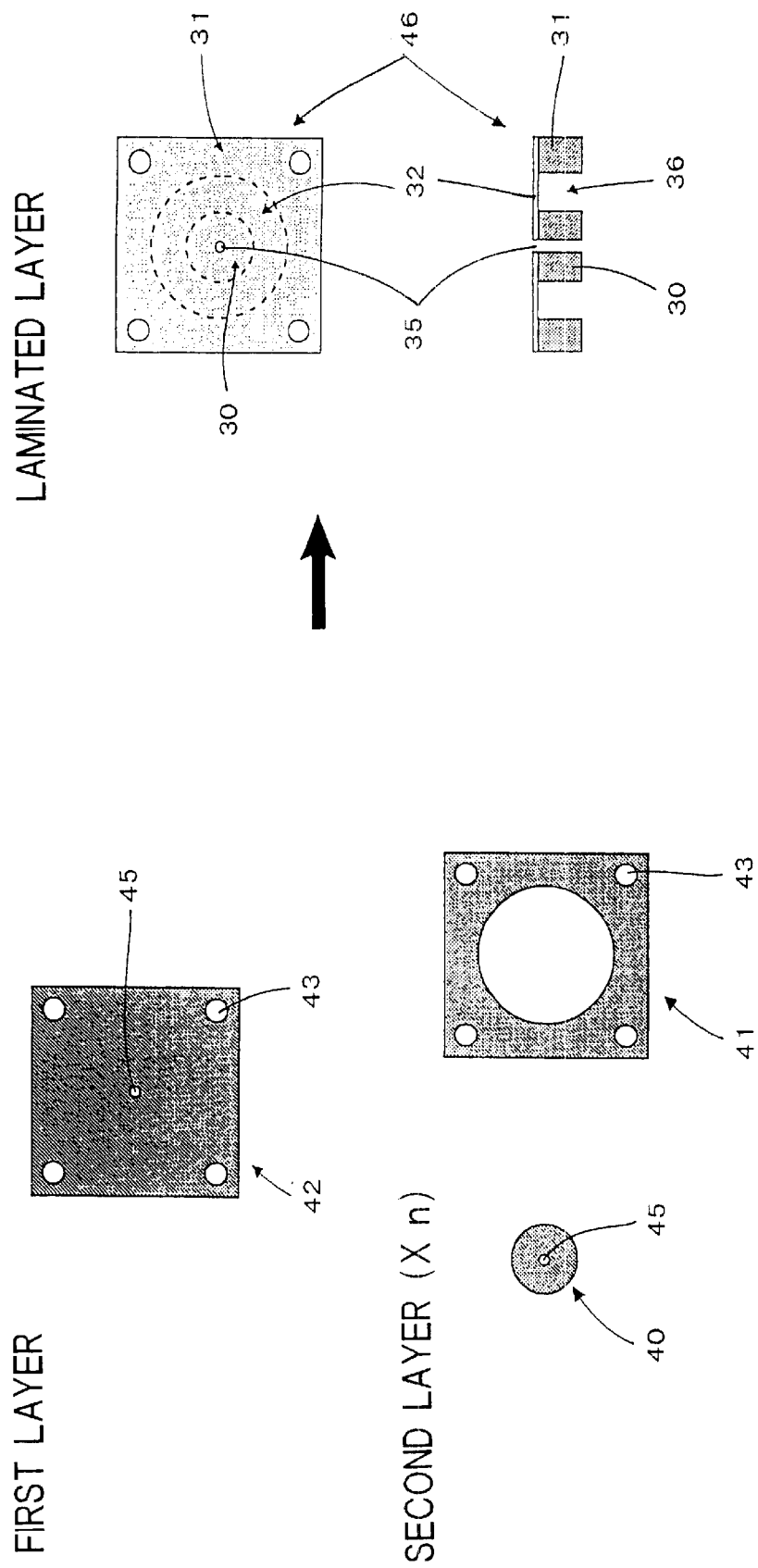
FIG. 14 is a process view showing an example of a laminated-layer manufacturing method.
Figure 16:
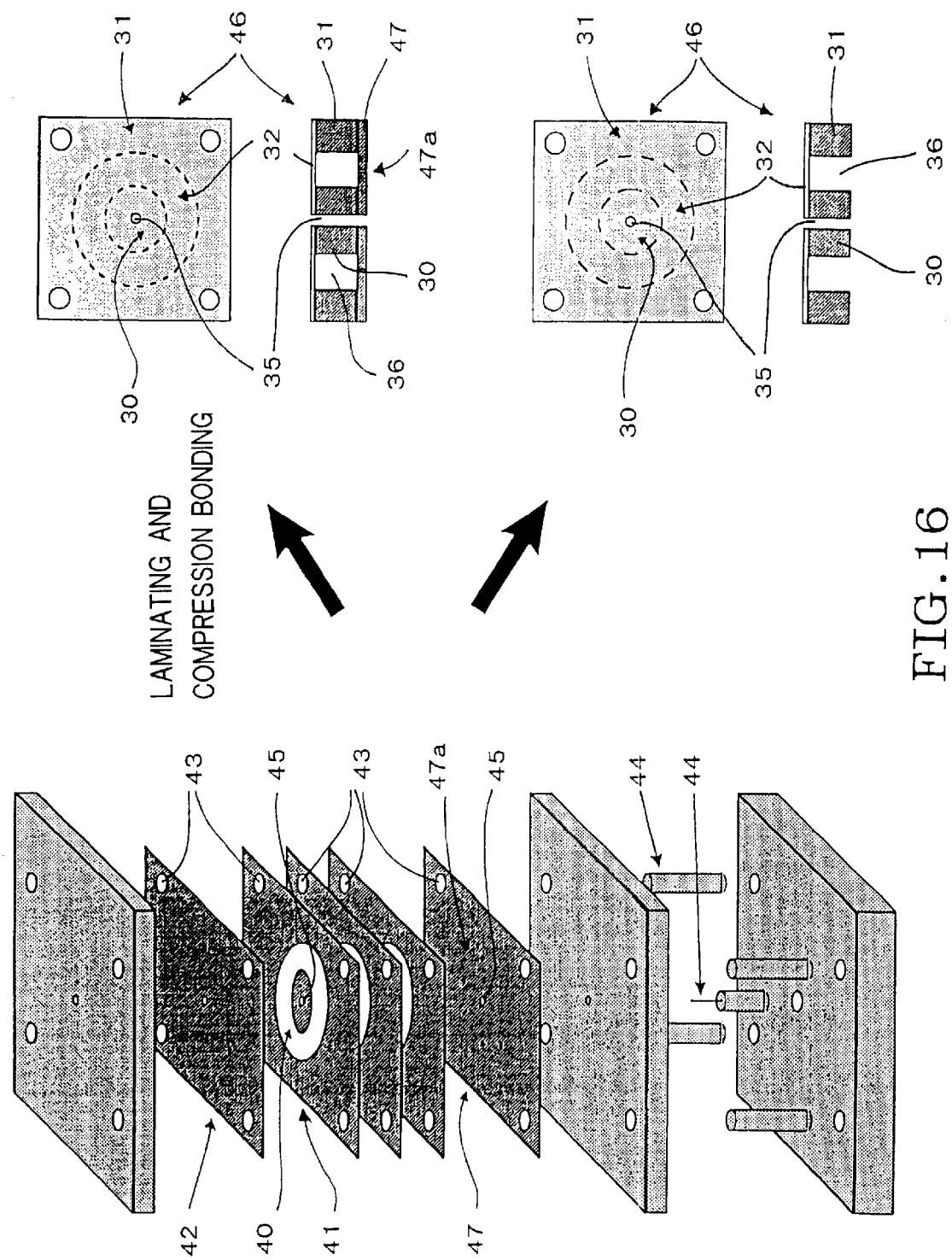
FIG. 16 is a process view showing an example of a laminated-layer manufacturing method.

Furthermore, as shown in FIGS. 14 and 16, it is more preferable that through holes 45 and 43 be punched in the center of green sheets 40 and 42 of the configuration in cross section of the weight and the flexible plate and in the four corners of green sheets 41 and 42 of the configuration in cross section of the support and the flexible plate, and laminating and compression-bonding are performed in a state where support pins 44 pass through the through holes 45 and 43 to form a laminated layer 46 because the positioning accuracy is increased.

Figure 15:
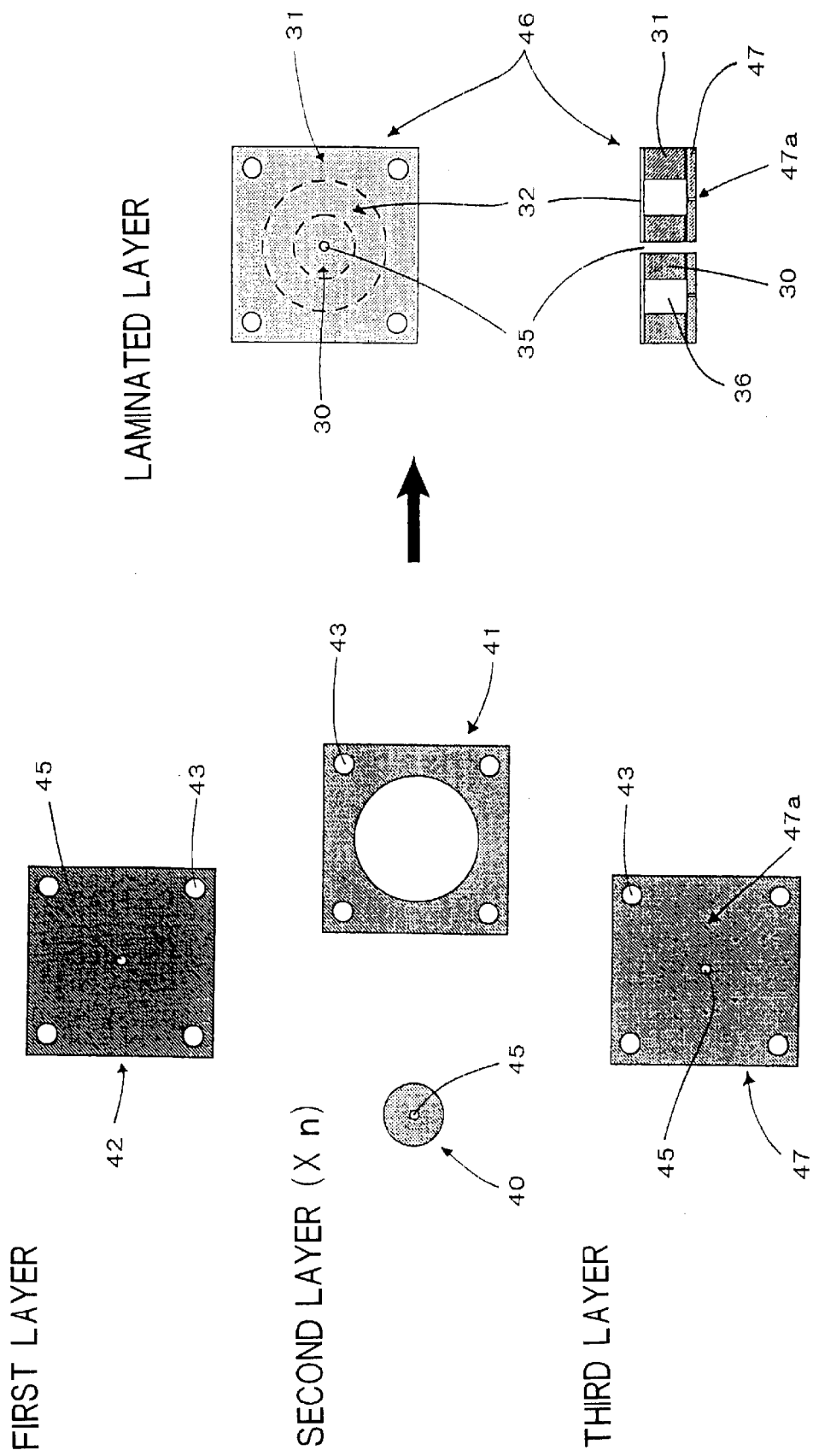
FIG. 15 is a process view showing an example of a laminated-layer manufacturing method.

In addition, as shown in FIGS. 15 and 16, it is preferable that after the green sheets 40, 41, and 42 of the configuration in cross section of the weight, the support, and the flexible plate have been laminated and compression bonded on a planar green sheet 47 to form the laminated layer 46, and then which has been integrally sintered to form a sintered body 48, the sintered planar green sheet 47 is cut in order that the lower end of the weight 30 can move.

According to the above method, since sintering is performed in a state where the support 31 lower-end is closed and the rigidity of the laminated layer 46 is maintained, there is an advantage in that deformation due to the sintering is small.

In addition, although the green sheet may be cut after sintering the laminated layer and before forming the piezoelectric elements, there is a concern that the relative position with respect to the weight and the support may change due to sintering shrinkage of the piezoelectric body, resulting in increased another axis sensitivity, so that it is preferably cut after forming the piezoelectric elements.

Figure 19:
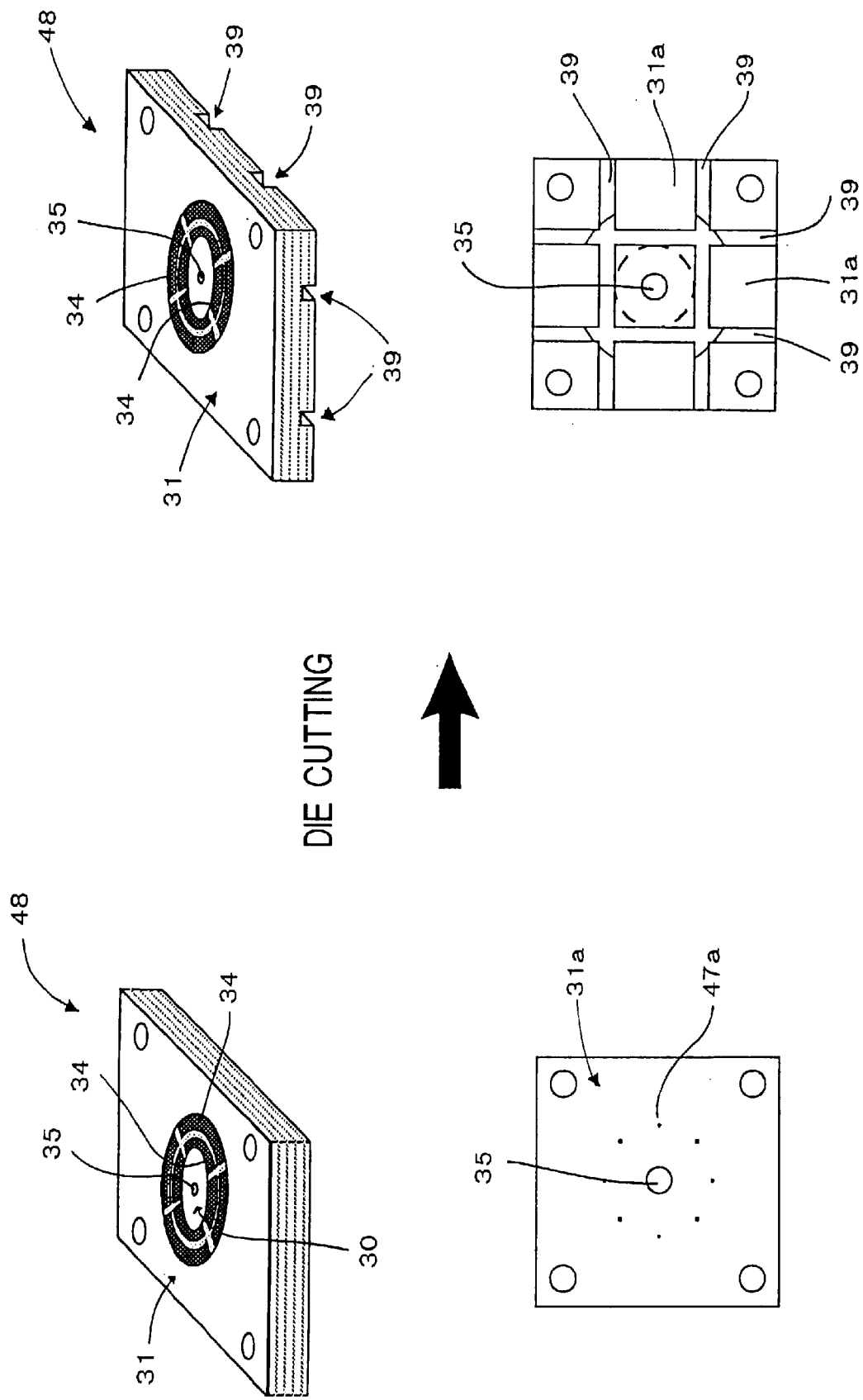
FIG. 19 is a process view showing an example of a cutting method of a plane-like green sheet.

The method of cutting the green sheet 47 is not particularly limited so long as it is cut so that the lower end of the weight 30 is movable, and a method of cutting along the shape of the support hollow part 36 as well as a method of linearly dicing as shown in FIG. 19 are possible.

In the case of adopting the cutting method by dicing, it is possible to form, at the support lower-end surface 31a; the narrow grooves 39 communicating with the space at the side of the outer periphery of the support 31 simultaneously with the cutting of the weight 30. In addition, the green sheet 47 is preferably provided with a small hole 47a for degreasing during sintering.

Figure 17:
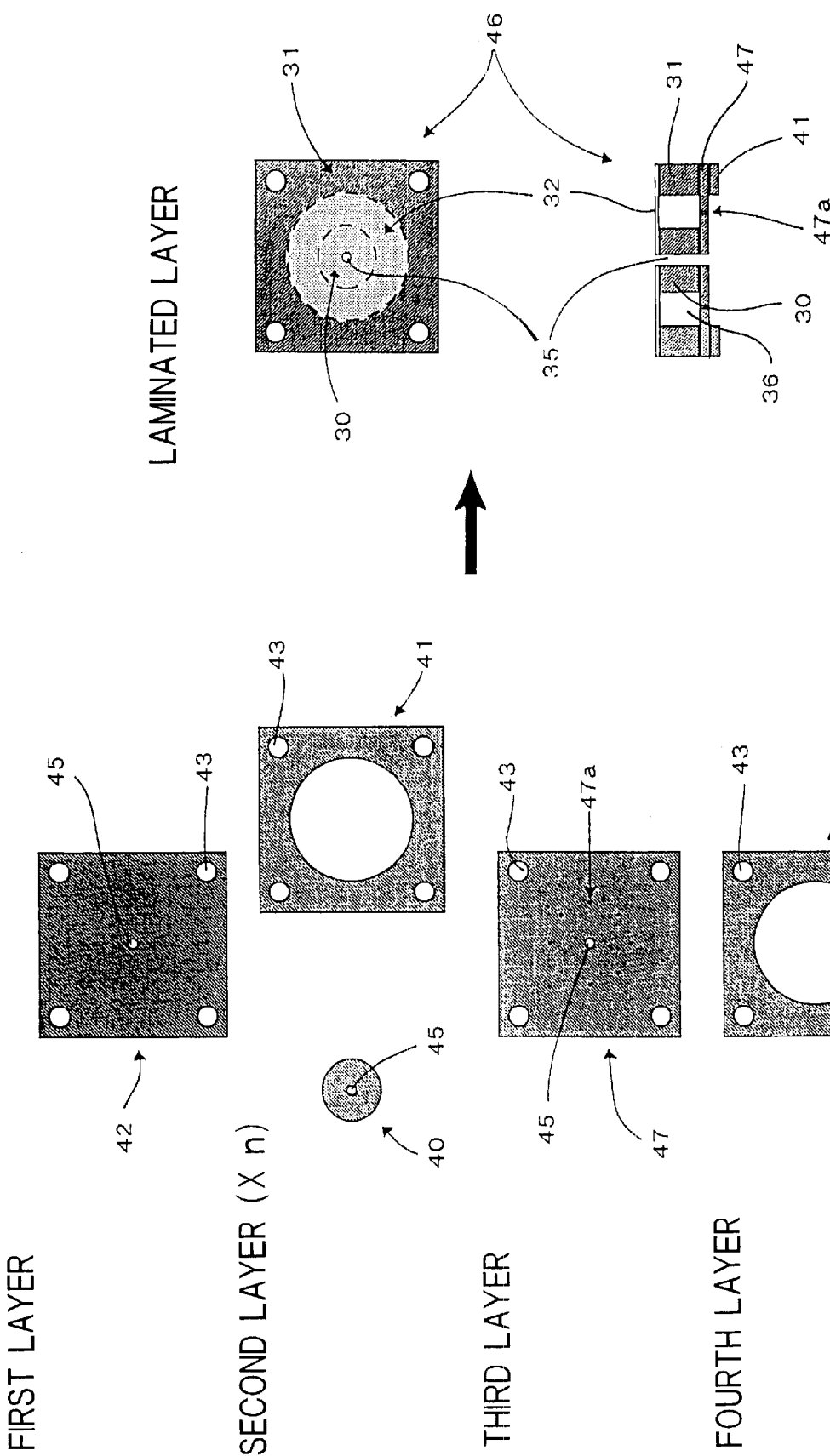
FIG. 17 is a process view showing an example of a laminated-layer manufacturing method.

Furthermore, as shown in FIG. 17, it is possible that after the planar green sheet 47 has been placed on the green sheet 41 of the configuration in cross section of the support, and further the green sheets 40, 41, and 42 of the configuration in cross section of the weight, the support, and the flexible plate have been laminated and compression bonded to form the laminated layer 46, and then the laminated layer 46 has been integrally sintered to form the sintered body 48, the sintered planar green sheet 47 is cut so that the lower end of the weight is movable.

According to the above method, as shown in FIGS. 20(a) and 20(b), it is possible to form the sensor element in which a jig such as a core, etc., is suspended so that the plane 38 including the support lower-end surface does not contact the weight lower-end surface 30a without inserting it for each sensor element.

In addition, in this instance as well, the aforesaid effects of reducing the sintering deformation can be obviously obtained, and it is possible to form, at the support lower-end surface 31a, the narrow grooves 39 communicating with the space at the side of the outer periphery of the support 31.

Figure 21:
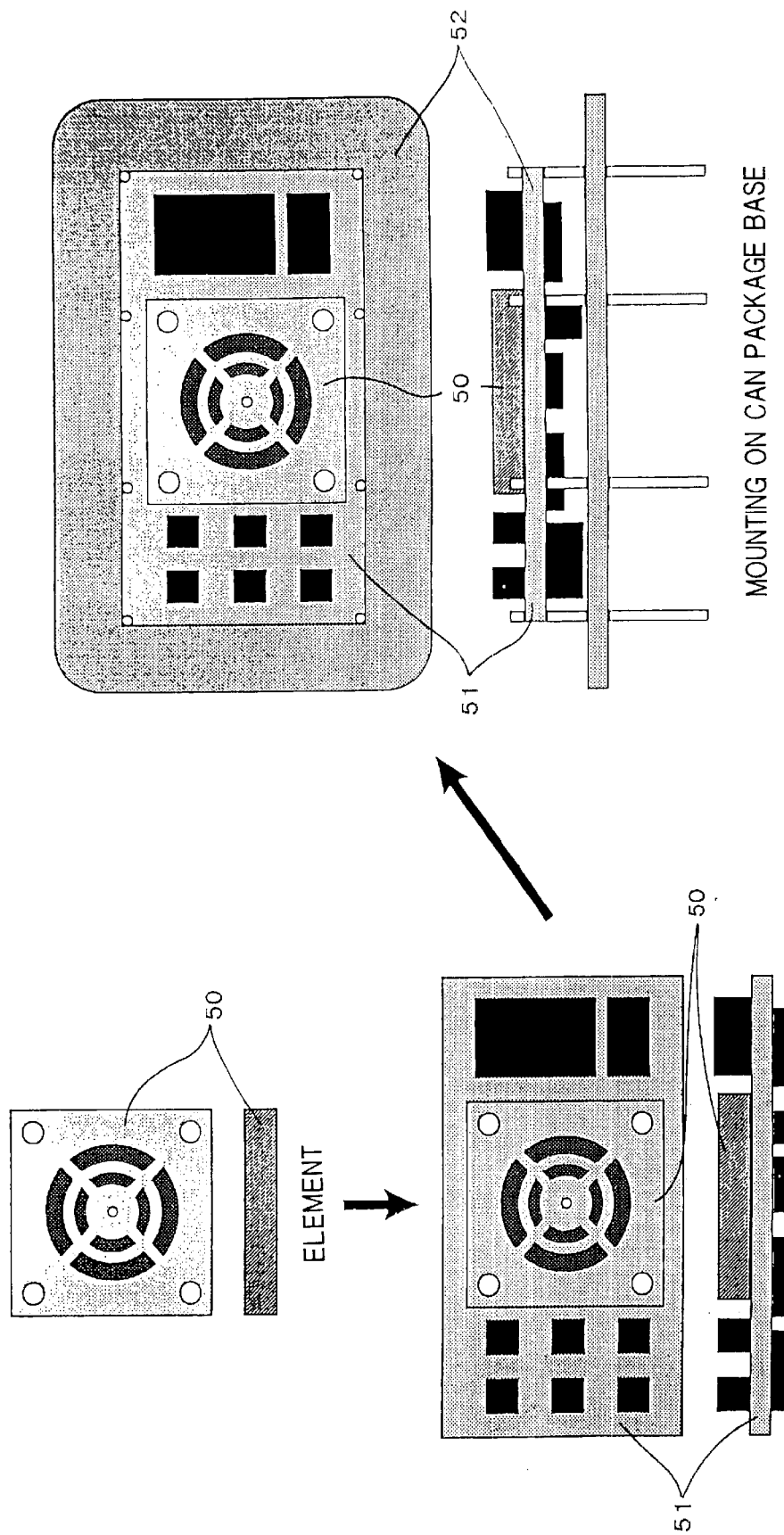
FIG. 21 is a process view showing a manufacturing method of an acceleration sensor according to the present invention.
Figure 22:
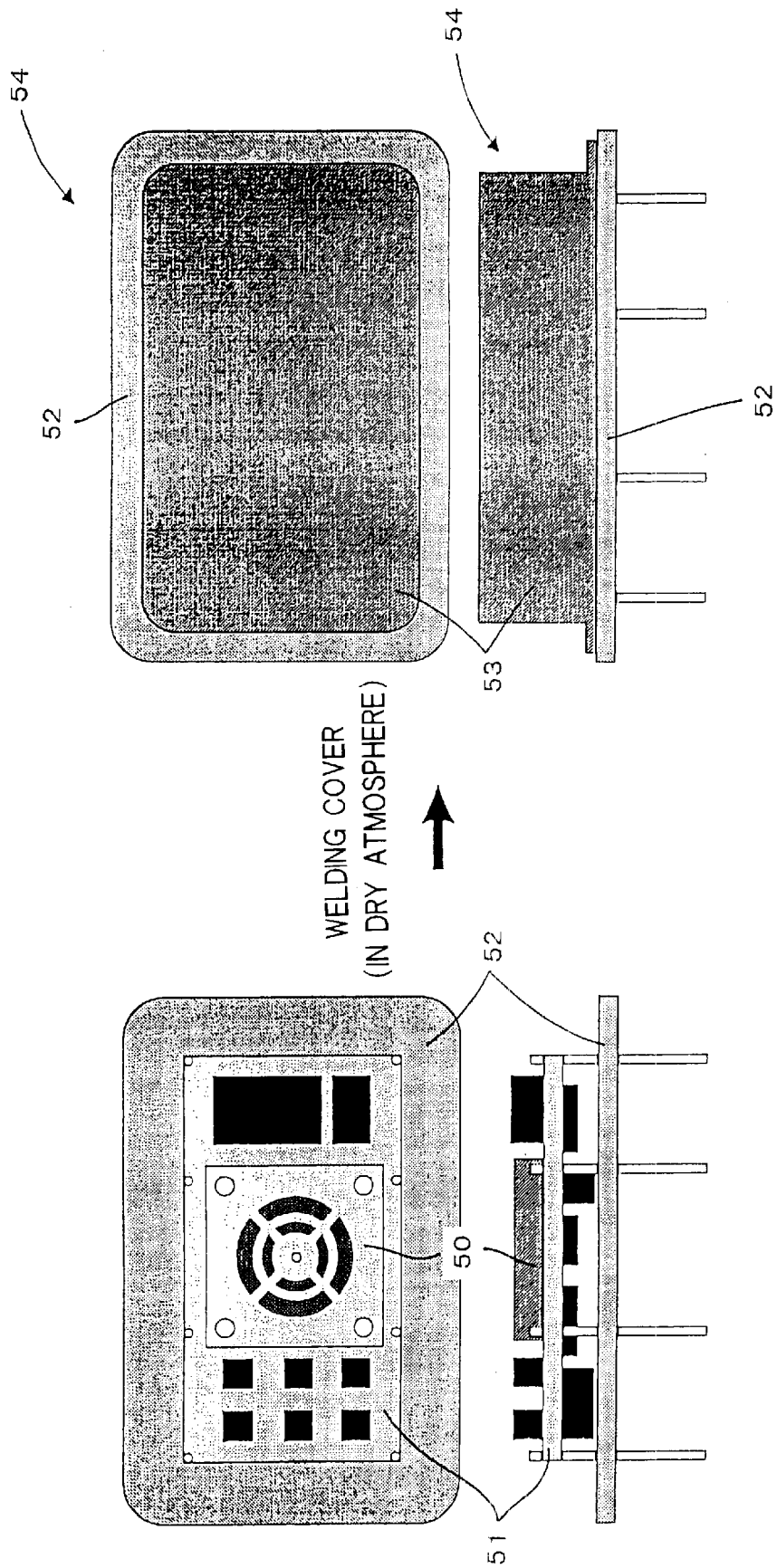
FIG. 22 is a process view showing a manufacturing method of the acceleration sensor according to the present invention.

As shown in FIGS. 21 and 22, an acceleration sensor element 50 according to the present invention is fixed to a circuit board 51 and is sealed by a cover 53 to form an acceleration sensor 54, and when manufacturing the acceleration sensor 54, it is preferably sealed by the cover 53 in a dry atmosphere with a dew point of −40° C. or less. Consequently, condensation in the sensor can be prevented, and weight changes due to condensation at the flexible plate 32 or the weight 30 affecting the acceleration can be prevented, thereby maintaining sensor accuracy.

In addition, according to the manufacturing method of the acceleration sensor mentioned above, in the sensor element having the through hole 35 provided at the center of the weight 30 as shown in FIGS. 11(a) and 11(b), the space above the flexible plate 32 and the support hollow part 36 communicate with each other via the through hole 35, so that a space in the support hollow part 36 is also replaced by a dry gas having a low dew point. Accordingly, the sensor element in which the weight is suspended so that the lower-end surface 30a thereof does not contact the circuit board 38, etc., as shown in FIGS. 13(a) and 13(b) is preferable from the viewpoint of facilitating communication of the dry gas at the weight lower-end surface 30a side.

A preferred example of the sensor element according to the present invention will be described hereinbelow with a manufacturing method therefor.

EXAMPLE 1

First, as shown in FIG. 17, the planar green sheet 47 was placed over the green sheet 41 of the configuration in cross section of the support, and further the green sheets 40, 41, and 42 of the configuration in cross section of the cylindrical weight, the rectangular prism support having a cylindrical hollow part, and the flexible plate were laminated and compression bonded to form a laminated layer.

In this instance, through holes 45 and 43 were punched in the center of the green sheets 40 and 42 of the configuration in cross section of the weight and the flexible plate and in four corners of the green sheets 41 and 42 of the configuration in cross section of the support and the flexible plate, and laminating was performed in a state where support pins 44 pass through the through holes 45 and 43. Next, the laminated layer was integrally sintered at 1400 to 1500° C. for two hours to form a sintered body.

Furthermore, piezoelectric elements 34 were formed on the sintered body 48 similarly to the case in FIG. 18. In this instance, after a lower electrode 58, a piezoelectric body 33, and upper electrodes 57a and 57b had been sequentially disposed by screen-printing only at the flexible parts 32a of the flexible plate, similarly to the sensor in FIGS. 1(a) and 1(b), sintering was performed at 1200 to 1300° C. for three hours.

In addition, as for the piezoelectric elements, after printing the lower electrode 58 and the piezoelectric body 33 so as to have a doughnut shape similar to that of the sensor in FIGS. 1(a) and 1(b), they are divided into eight parts, and then the upper electrodes 57a and 57b were printed, thereby forming a total of eight piezoelectric elements. Finally, similarly to the case in FIG. 19, the planar green sheet was diced by the die, and the diced green sheet contacts the cylindrical weight 30, and then the lower end of the weight 30 was cut off, thereby yielding the sensor element of the invention.

The sensor element was made into an acceleration sensor by the following method. That is, as shown in FIGS. 21 and 22, after a sensor element 50 had been positioned at a desired position on a circuit board 51, an adhesive agent was injected from the outer periphery of the support lower-end surface, thereby fixing the sensor element 50 on the circuit board 51.

An acceleration sensor 54 was manufactured in a manner such that after the circuit board 51 had been fixed to a CAN package base 52 by soldering, and in which a dry nitrogen gas had been used to purge to produce a dry atmosphere having a dew point of −40° C. or less in a CAN seal device having a glove box (Japan Avionics), a CAN package case 53 was sealed airtight by welding.

INDUSTRIAL APPLICABILITY

According to the sensor element of the present invention, as described above, since deflection stress in the flexible plate is concentrated in portions in which piezoelectric elements are disposed, higher sensor sensitivity can be realized without increased weight or size. Accordingly, the invention can be in particular preferably used when using an amplifier having large input impedance such as a field-effect transistor (FET) as an amplifier of an output from the piezoelectric elements.

In addition, according to the manufacturing method of the present invention, a highly sensitive, highly accurate, and highly reliable sensor element can be easily manufactured.

What is claimed is:

1. An acceleration sensor element comprising:

a weight;

a support having a lower end surface and a hollow part, said support being disposed around the weight as a center;

a flexible plate disposed horizontally across the support so as to suspend the weight at the center of the hollow part of said support;

at least one piezoelectric element disposed on the flexible plate, and comprising a piezoelectric body sandwiched by at least one set of electrodes, wherein acceleration applied from the exterior is converted to a deflection of said flexible plate based on the behavior of said weight corresponding to the acceleration, and the direction and the rate of said acceleration are three-dimensionally determined by electric charges generated from said piezoelectric body corresponding to the deflection of the flexible plate;

wherein the piezoelectric elements are disposed continuously over the flexible parts of the flexible plate from at least one of the upper part of the weight and the support at the plane of projection seen from the upper part of said flexible plate; and wherein narrow grooves communicating with at least a space at the side of an outer periphery of the support are formed at positions on the lower end surface of the support, said grooves being symmetric with respect to straight lines passing through a center of the support and parallel to a plane including the support lower end surface.

2. An acceleration sensor element as in claim 1, wherein the support, the weight, and the flexible plate are integrally sintered by a green-sheet lamination technique.

3. An acceleration sensor element as in claim 1, wherein the support, the weight, and the flexible plate are integrally formed, and a crystal structure of at least one of the support, the weight, and the flexible plate is different from that of the others.

4. An acceleration sensor element as in claim 2, wherein the support, the weight, and the flexible plate are integrally formed, and a crystal structure of at least one of the support, the weight, and the flexible plate is different from that of the others.

5. An acceleration sensor element as in claim 1, wherein the support, the weight, and the flexible plate are integrally formed, and a crystal-grain diameter of at least one of the support, the weight, and the flexible plate is different from the others.

6. An acceleration sensor element as in claim 2, wherein the support, the weight, and the flexible plate are integrally formed, and a crystal-grain diameter of at least one of the support, the weight, and the flexible plate is different from the others.

7. An acceleration sensor element as in claim 1, further comprising a hole penetrating perpendicularly through the center of the weight so that a space above the flexible plate and the hollow part of the support communicate with each other.

8. An acceleration sensor element as in claim 2, further comprising a hole penetrating perpendicularly through the center of the weight so that a space above the flexible plate and the hollow part of the support communicate with each other.

9. An acceleration sensor element as in claim 1, wherein the weight is suspended so that a plane including the lower end surface of the support does not contact a lower end surface of the weight.

10. An acceleration sensor element as in claim 2, wherein the weight is suspended so that a plane including the lower end surface of the support does not contact a lower end surface of the weight.

* * * * *